(12) United States Patent
Maruo et al.

(10) Patent No.: US 8,496,315 B2
(45) Date of Patent: Jul. 30, 2013

(54) REGISTRATION ADJUSTMENT VALUE DETERMINATION METHOD, RECORDING SYSTEM, AND REGISTRATION ADJUSTMENT METHOD

(75) Inventors: Hiroyuki Maruo, Tokyo (JP); Jouji Odaka, Tokyo (JP)

(73) Assignee: Canon Finetech Inc., Ibaraki (JP)

( * ) Notice: Subject to any disclaimer, the term of this patent is extended or adjusted under 35 U.S.C. 154(b) by 1264 days.

(21) Appl. No.: 11/762,041

(22) Filed: Jun. 12, 2007

(65) Prior Publication Data
US 2007/0296752 A1 Dec. 27, 2007

(30) Foreign Application Priority Data

Jun. 26, 2006 (JP) ................. 2006-174991
Jun. 26, 2006 (JP) ................. 2006-174997

(51) Int. Cl.
B41J 29/393 (2006.01)
B41J 29/38 (2006.01)

(52) U.S. Cl.
USPC ............................ 347/19; 347/13

(58) Field of Classification Search
USPC ..................................... 347/13, 19
See application file for complete search history.

(56) References Cited

U.S. PATENT DOCUMENTS

| | | | | |
|---|---|---|---|---|
| 7,083,274 B2 * | 8/2006 | Morita et al. | ................ | 347/104 |
| 2002/0041299 A1 | 4/2002 | Lee et al. | | |
| 2003/0001914 A1 | 1/2003 | Matsumoto et al. | | |
| 2005/0052494 A1 | 3/2005 | Takahashi et al. | | |
| 2005/0062784 A1 | 3/2005 | Matsuzaki et al. | | |
| 2005/0099439 A1 * | 5/2005 | Folkins | ........................... | 347/8 |
| 2005/0212833 A1 | 9/2005 | Yoshida | | |

FOREIGN PATENT DOCUMENTS

| | | |
|---|---|---|
| EP | 0735504 A2 | 10/1996 |
| JP | 6-210931 | 8/1994 |
| JP | 7-323582 | 12/1995 |
| JP | 9-286123 | 11/1997 |
| JP | 11-235813 | 8/1999 |
| JP | 2001-16375 | 1/2001 |
| JP | 2004-160359 | 4/2004 |
| JP | 2005-53167 | 3/2005 |
| JP | 2006-027161 | 2/2006 |
| JP | 2006-116845 | 5/2006 |
| JP | 2006-150708 | 6/2006 |

* cited by examiner

Primary Examiner — Julian Huffman
(74) Attorney, Agent, or Firm — patenttm.us

(57) ABSTRACT

A recording system for relatively easily and rapidly performing a registration adjustment in a recording device having a plurality of recording units which record divided recording images on the same recording medium. The recording system causes each of recording units (108A-108F) to record a registration adjustment pattern. Based on the recorded pattern, an inter-unit adjustment that is a registration adjustment among the plurality of recording units and an intra-unit adjustment that is a registration adjustment among the plurality of recording heads in each recording unit are performed.

20 Claims, 24 Drawing Sheets

RECORDABLE STATUS

STANDBY STATUS

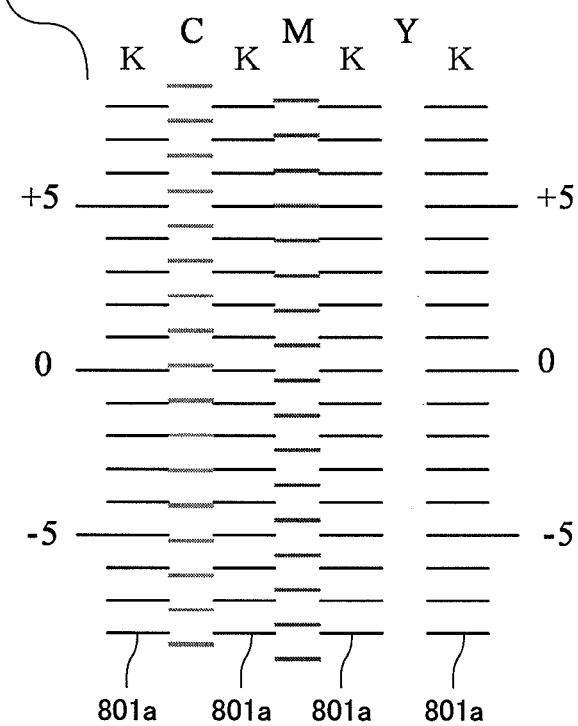
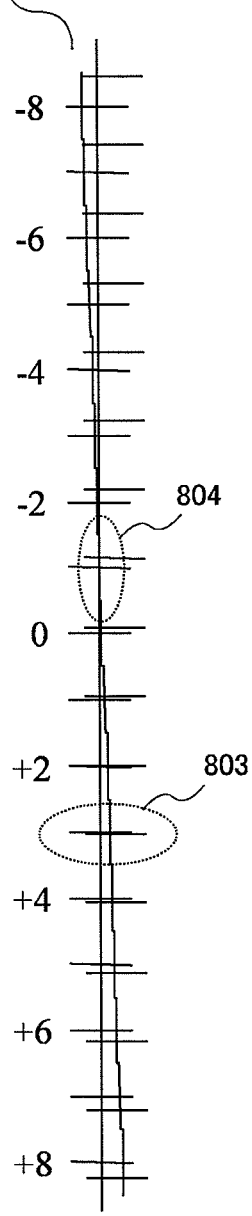
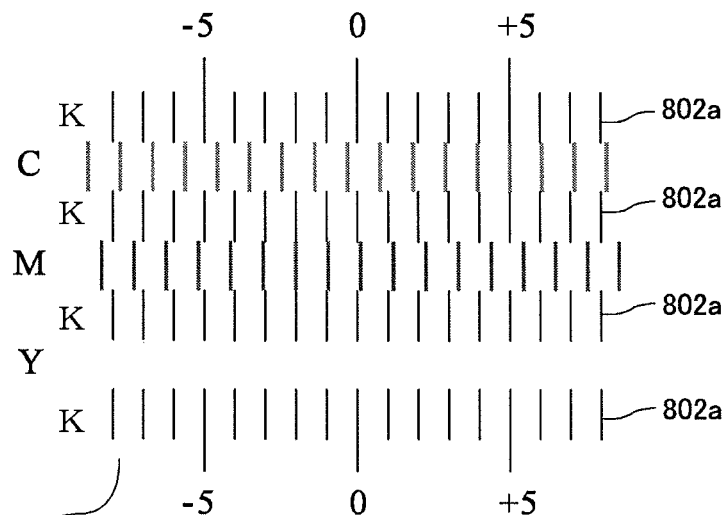
FIG. 9

HEAD CONFIGURATION
INFORMATION TABLE 501

| |
|---|
| NUMBER OF CONNECTED RECORDING UNITS (N) — 502 |
| COLOR INFORMATION ON FIRST HEAD OF RECORDING UNIT #1 |
| COLOR INFORMATION ON SECOND HEAD OF RECORDING UNIT #1 |
| COLOR INFORMATION ON THIRD HEAD OF RECORDING UNIT #1 |
| COLOR INFORMATION ON FOURTH HEAD OF RECORDING UNIT #1 |
| COLOR INFORMATION ON FIFTH HEAD OF RECORDING UNIT #1 |
| COLOR INFORMATION ON SIXTH HEAD OF RECORDING UNIT #1 |
| COLOR INFORMATION ON FIRST HEAD OF RECORDING UNIT #2 |
| COLOR INFORMATION ON SECOND HEAD OF RECORDING UNIT #2 |
| COLOR INFORMATION ON THIRD HEAD OF RECORDING UNIT #2 |
| COLOR INFORMATION ON FOURTH HEAD OF RECORDING UNIT #2 |
| COLOR INFORMATION ON FIFTH HEAD OF RECORDING UNIT #2 |
| COLOR INFORMATION ON SIXTH HEAD OF RECORDING UNIT #2 |
| ⋮ |

REGISTRATION ADJUSTMENT VALUE DETERMINATION METHOD, RECORDING SYSTEM, AND REGISTRATION ADJUSTMENT METHOD

DETAILED DESCRIPTION

1. Field of the Invention

The present invention relates to a recording system that records an image on the same recording medium using plural recording units each having a plurality of line-type recording heads, and more particularly to the registration adjustment value determination method and the registration adjustment method of the recording system.

2. Description of the Related Art

Conventionally, a recording system, which records an image using a recording head based on the inkjet recording method, uses a plurality of recording heads to satisfy the need of color recording. In such a recording system, a predetermined test pattern is recorded using the plural recording heads to detect the amount of error or misalignment among the recording heads and, according to the detected error amount, the registration is adjusted for adjusting the recording positions of an image recorded by the recording heads (see Japanese Patent Laid-Open Publication No. Hei 7-323582).

An inkjet recording device, which uses the so-called line-type recording head extending across the full width of a recording medium, is also known (see Japanese Patent Laid-Open Publication No. 2004-106359).

Meanwhile, a recording device is known that uses plural recording units, each including a plurality of line-type heads, to record an image wider than the recording width of each recording unit onto the same recording medium.

This type of recording device requires the adjustment of registration not only among plural recording heads in each recording unit but also among the recording units, making the adjustment task complicated.

Another problem is that, depending upon the adjustment method, the adjustment of registration among recording units makes the adjustment range of the recording heads in a recording unit too narrow to make an appropriate adjustment.

In view of the foregoing, it is an object of the present invention to provide a registration adjustment value determination method and a recording system that allow the user to easily and quickly adjust the registration in a recording device that records an image on the same recording medium using a plurality of recording units each including plural line-type heads.

In addition, in a recording system where plural recording units are used to record an image on a common (one sheet of) recording medium such as a large-sized recording medium, a life-expired recording unit is replaced by a new recording unit or the color configuration of recording heads is changed from the black-only configuration to the full-color configuration. In these cases, to adjust the registration of the newly installed recording unit, the information on the number of recording heads of the newly-installed recording unit or the information on the color configuration of the recording heads is sometimes changed.

In such a case, the user need to check the number of recording heads or the color configuration of recording heads before adjusting the registration and, based on the checking result, to adjust the registration. Therefore, it is too complex for a user, not familiar with the system configuration, to do such a task and the registration adjustment takes long.

It is another object of the present invention to allow the user to adjust the registration with no consideration for the number of heads and the color configuration of heads when the number of recording heads in a recording unit is increased or decreased, when the color configuration of recording heads is changed, or when a recording unit is replaced.

SUMMARY OF THE INVENTION

A registration adjustment value determination method according to the present invention is a method for determining registration adjustment values for use in a recording device having a plurality of recording units, each including a plurality of line-type recording heads, for recording divided recording images on the same recording medium using the plurality of recording units, the registration adjustment value determination method comprising the steps of causing the plurality of recording units to record a predetermined registration adjustment pattern; making an inter-unit adjustment that is a registration adjustment among the plurality of recording units based on the recorded registration adjustment pattern; and making an intra-unit adjustment that is a registration adjustment among the plurality of recording heads in each recording unit.

Neighboring recording units of the plurality of recording units have an overlapping recording area where recording areas of the neighboring recording units overlap each other in end parts of the recording heads thereof, the inter-unit adjustment part in the registration adjustment pattern is a pattern part recorded in the overlapping recording area of the neighboring recording units of the plurality of recording units by a reference head being one of the recording units and a corresponding reference head of another recording unit, and the same adjustment value is simultaneously added to all other recording units on a side of a compared recording unit when a recording position of the compared recording unit is corrected, the compared recording unit being compared with a reference recording unit during the inter-unit adjustment, the reference recording unit being one of the neighboring two recording units.

Preferably, the registration adjustment value determination method further comprises the step of calculating an average value from a maximum value and a minimum value of adjustment values of all recording units as a result of the inter-unit adjustment and correcting and resetting the adjustment values of all recording units equally by the average value.

A recording system according to the present invention is a recording system having a plurality of recording units, each including a plurality of line-type recording heads, for recording divided recording images on the same recording medium using the plurality of recording units. The recording system comprises adjustment pattern recording means that records a predetermined registration adjustment pattern using the plurality of recording units; and adjustment value setting means that sets adjustment values based on the recorded registration adjustment pattern wherein the adjustment value setting means sets an inter-unit adjustment value obtained for a reference recording head of each recording unit for adjusting registration among the plurality of recording units and an intra-unit adjustment value for recording heads other than the reference recording head in each recording unit.

The predetermined registration adjustment pattern comprises an inter-unit adjustment part, an intra-unit vertical registration adjustment part, and an intra-unit horizontal registration adjustment part that are formed on one recording medium.

Another aspect of a recording system according to the present invention is a recording system having a plurality of recording units, each including a plurality of line-type recording heads, for recording divided recording images on the same recording medium using the plurality of recording units. The recording system comprises adjustment pattern recording means that records a predetermined registration adjustment pattern using the plurality of recording units; and adjustment value setting means that sets adjustment values based on the recorded registration adjustment pattern wherein the adjustment value setting means sets the adjustment values determined by the registration adjustment pattern and corrected by software.

Another recording system according to the present invention is a recording system wherein a plurality of recording units, each including a plurality of recording heads, and an information processing device are connected via a communication interface for forming an image on the same recording medium using the plurality of recording units, wherein the information processing device comprises means that acquires the number of the plurality of recording units, layout information thereof, and configuration information on the recording heads included in each recording unit; means that selects a registration adjustment pattern based on the acquired information and causes the plurality of recording units to record the registration adjustment pattern; means that displays a user interface screen for setting adjustment values acquired based on the registration adjustment pattern; and means that sends the adjustment values, set on the user interface screen, to the recording units.

When the registration of plural recording units is adjusted in this recording system, the information processing device acquires the number of the plural recording units, its layout information, and the configuration information on recording heads included in each recording unit. A registration adjustment pattern suited for the configuration can be selected based on the acquired configuration information. The system causes the plural recording units to record the registration adjustment pattern. In addition, the user interface screen is displayed to allow the user to set adjustment values acquired based on the recorded registration adjustment pattern. The adjustment values that are set on the user interface screen are sent to the recording units. This operation updates the adjustment values of the subsequent recording units and, at a later recording time, adjusts the registration according to the updated adjustment values.

The other configurations and effects of the present invention will be described more in detail with reference to the following embodiments.

BRIEF DESCRIPTION OF THE DRAWINGS

FIG. 9 is a partially enlarged diagram of the registration adjustment pattern in FIG. 8.

FIG. 21 is a diagram showing an example of the configuration of a head configuration information table in the embodiment of the present invention.

DETAILED DESCRIPTION OF PREFERRED EMBODIMENTS

Preferred embodiments of the present invention will be described in detail below with reference to the drawings.

Figure 1:
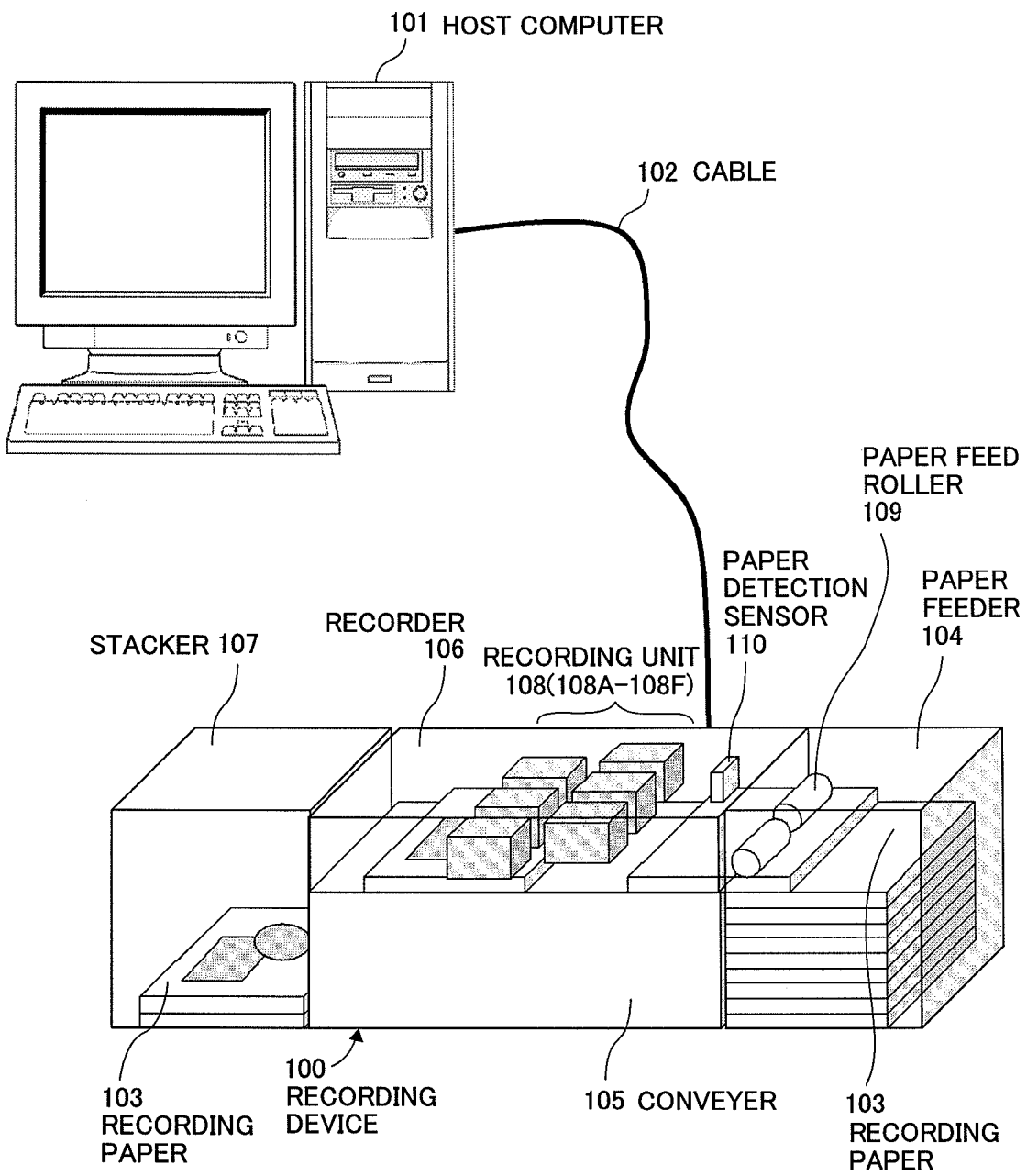
FIG. 1 is a diagram showing the general configuration of a recording system in an embodiment of the present invention.

FIG. 1 is a diagram showing the general configuration of a recording system in this embodiment. This recording system comprises a recording device 100 and a host computer 101 that instructs the recording device 100 to record an image.

The recording device 100, a recording device for recording on a recording paper 103, comprises a paper feeder 104, a conveyer 105, a recorder 106, and a stacker 107. The recording paper 103 is any recording medium such as a standard print paper, a cardboard, and a film.

The recorder 106 uses a combination of plural recording units 108A-108F to record an image on the recording paper 103 wider than the recording width of a single recording unit. Although six recording units are used in this example, the number of recording units is not limited to six but any number of recording units can be used. When referring not to all recording units 108A-108F but to one of them in the description below, the recording unit is referred to simply as a recording unit 108.

The recording unit 108 is connected to the host computer 101, which is an external device for outputting image data and its recording instruction, via a cable 102 that is an example of the communication interface. In this embodiment, the host computer 101 outputs information, such as recording data, to each recording unit 108 in the recording device 100 via the cable 102 as control commands. The communication interface may be any interface via which the recording device 100 can be connected to an information processing device, for example, USB (Universal Serial Bus), IEEE1394,or Ethernet (registered trademark) (10/100/1000BaseT). Although a wired communication interface is used in this embodiment, a wireless communication interface such as a wireless LAN or the like may also be used. When a network or the USB is used, the information processing device may be connected to the recording units 108 via a hub.

The paper feeder 104 has paper feed rollers 109 that pick up the recording paper 103 and convey the separated recording paper to the conveyer 105, one sheet at a time. The paper feed rollers 109 are driven by a feeding motor not shown.

The conveyer 105 has conveyance rollers (not shown) for conveying the recording paper 103, supplied from the paper feeder 104, to the recorder 106. An encoder (described below in FIG. 5) is attached to the conveying rollers for detecting the rotation on a unit amount basis. A paper detection sensor 110 is provided on the conveyance path of the recording paper 103 to detect the presence or absence of the recording paper 103. The output from the encoder and the paper detection sensor 110 is input to the recording units 108 of the recorder 106. The recording units 108 receive this output to identify the conveyance status of the recording paper 103.

The recording units 108 provided in the recorder 106 work together to record an image on the conveyed recording paper 103 using the inkjet recording method based on the image data received from the host computer 101. The recorded recording paper 103 is ejected and stacked in the stacker 107, one after another.

Figure 2:
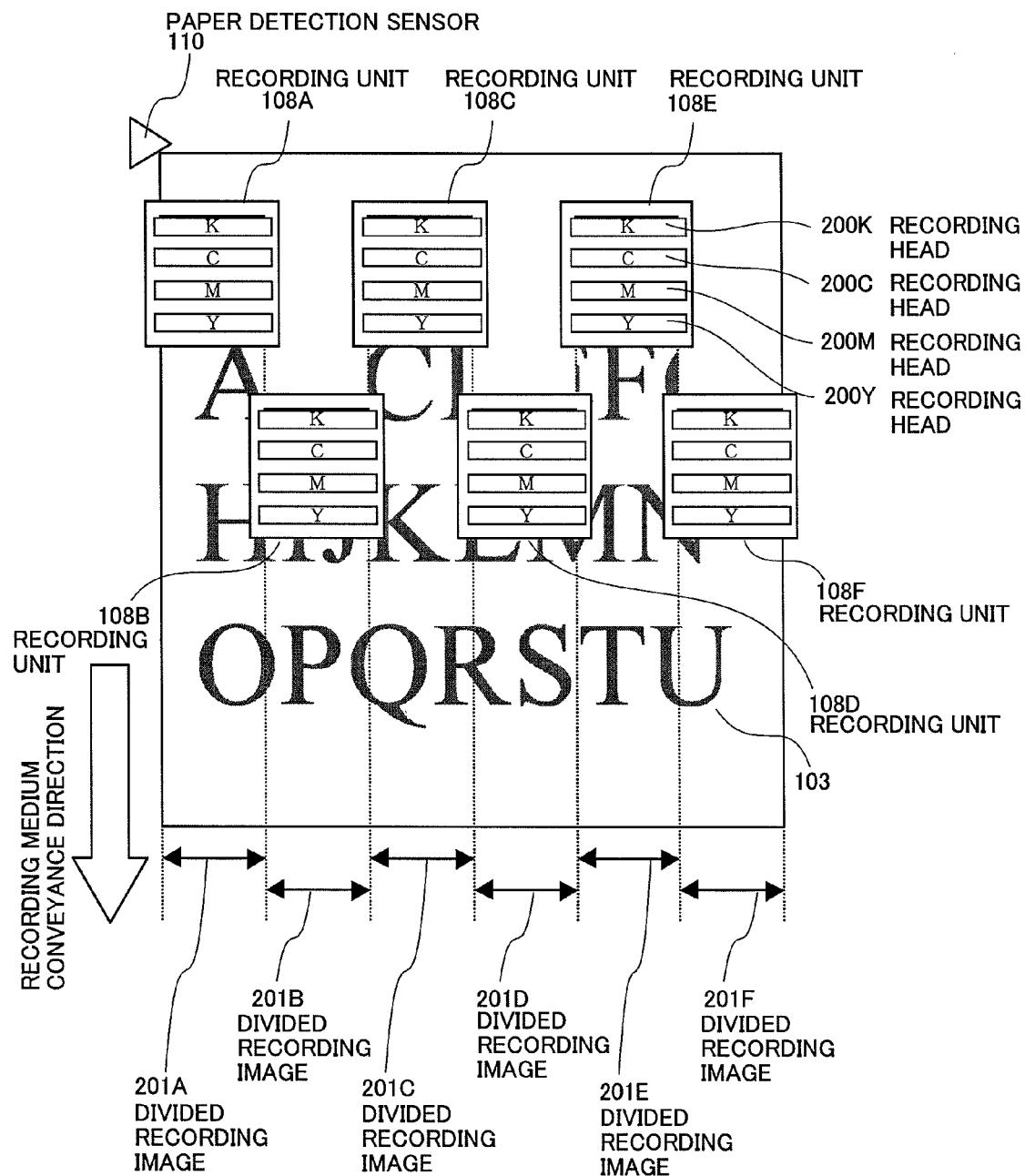
FIG. 2 is a diagram showing the layout of six recording units constituting a recorder of the recording device shown in FIG. 1.

FIG. 2 is a diagram showing the layout of six recording units 108A-108F that constitute the recorder 106 of the recording device shown in FIG. 1. Each of the recording units 108A-108F includes four recording heads 200K, 200C, 200M, and 200Y. Each of the recording heads 200 is so-called a line head on which a row of nozzles is extended in the direction orthogonal to the conveyance direction of the recording paper 103. The four recording heads 200, arranged in parallel, eject black (K), cyan (C), magenta (M), and yellow (Y) ink for full-color recording.

The recording units 108A-108F, arranged in the positions shifted each other in the paper width direction, record images in the different divided positions in the paper width direction across the full length of the recording paper 103. In this embodiment, the recording units 108A-108F are arranged in a zigzag way as shown in FIG. 2. Because of this arrangement, the ends of the rows of nozzles of the recording heads 200 of the neighboring recording units 108 are overlapped with each other. The rows of nozzles are partly overlapped in this way to avoid a blank part between the recording heads of the neighboring recording units.

Because the recording units 108A-108F are arranged in this way, the host computer 101 divides a recording image, which will be recorded on the recording paper 103, into plural areas according to the recordable width of each recording unit 108 and sends the divided areas to the recording units 108, one for each recording unit. In this embodiment, the host computer 101 sends divided recording images 201A-201F to the recording units 108A-108F, respectively, as shown in FIG. 2. Each recording unit 108 calculates the time, at which recording on the recording paper 103 is to start, based on the output signal from the paper detection sensor 110 and the encoder in the conveyer 105 and, when the time arrives, records the divided recording images, received from the host computer 101, onto the recording paper 103.

Figure 3A:
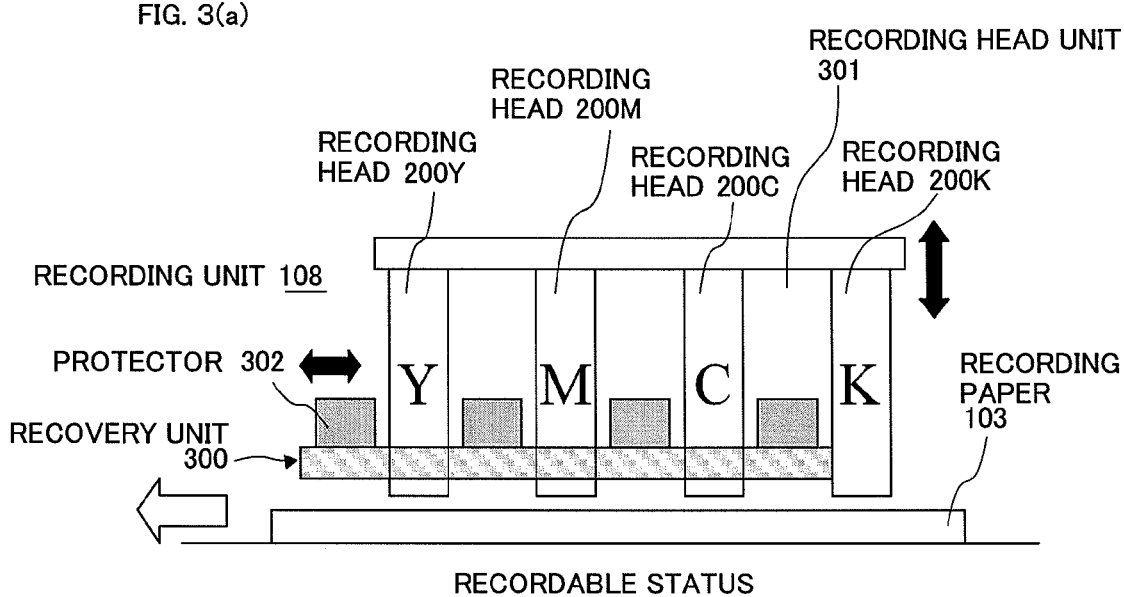
FIG. 3 is a diagram showing the general configuration of one recording unit mounted on the recording device shown in FIG. 1.
Figure 3B:
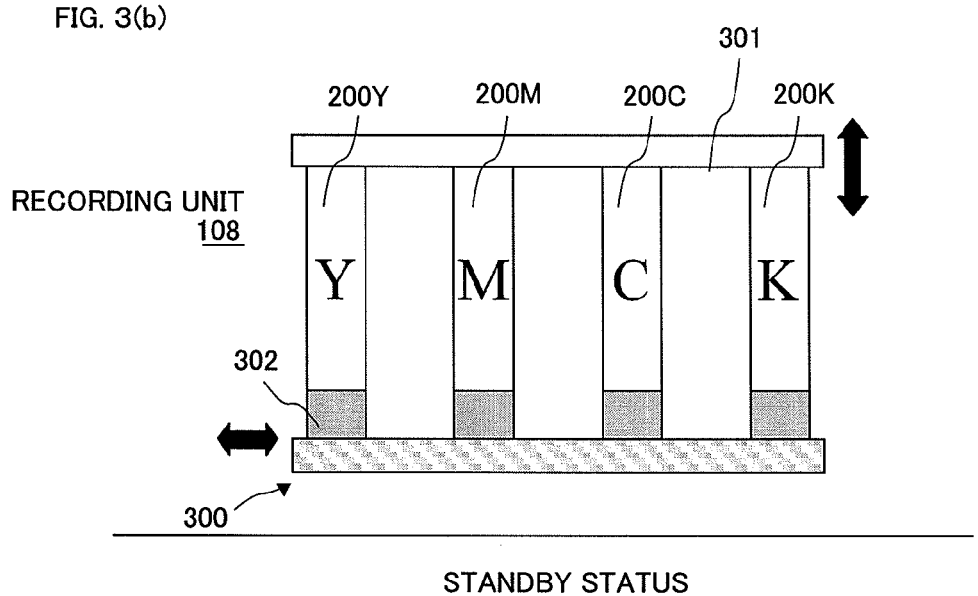

FIGS. 3(a) and 3(b) are diagrams showing the general configuration of one recording unit 108 mounted on the recording device in this embodiment. The recording unit 108 comprises four line heads, that is, recording heads 200K, 200C, 200M, and 200Y, and a recovery unit 300 that cleans those recording heads. The four recording heads 200K-200Y are integrated into one recording head unit 301 that is lifted and lowered by a head unit control motor (this will be described below in FIG. 5). The recovery unit 300, which has recording head protectors 302, one for each recording heads 200, is moved sideways by a recovery unit control motor (this will be described below in FIG. 5).

At recording time, the recording head unit 301 and the recovery unit 300 are moved into the recordable status as shown in FIG. 3(a); at standby time, the recording head unit 301 and recovery unit 300 are moved into the standby status as shown in FIG. 3(b).

Figure 4:
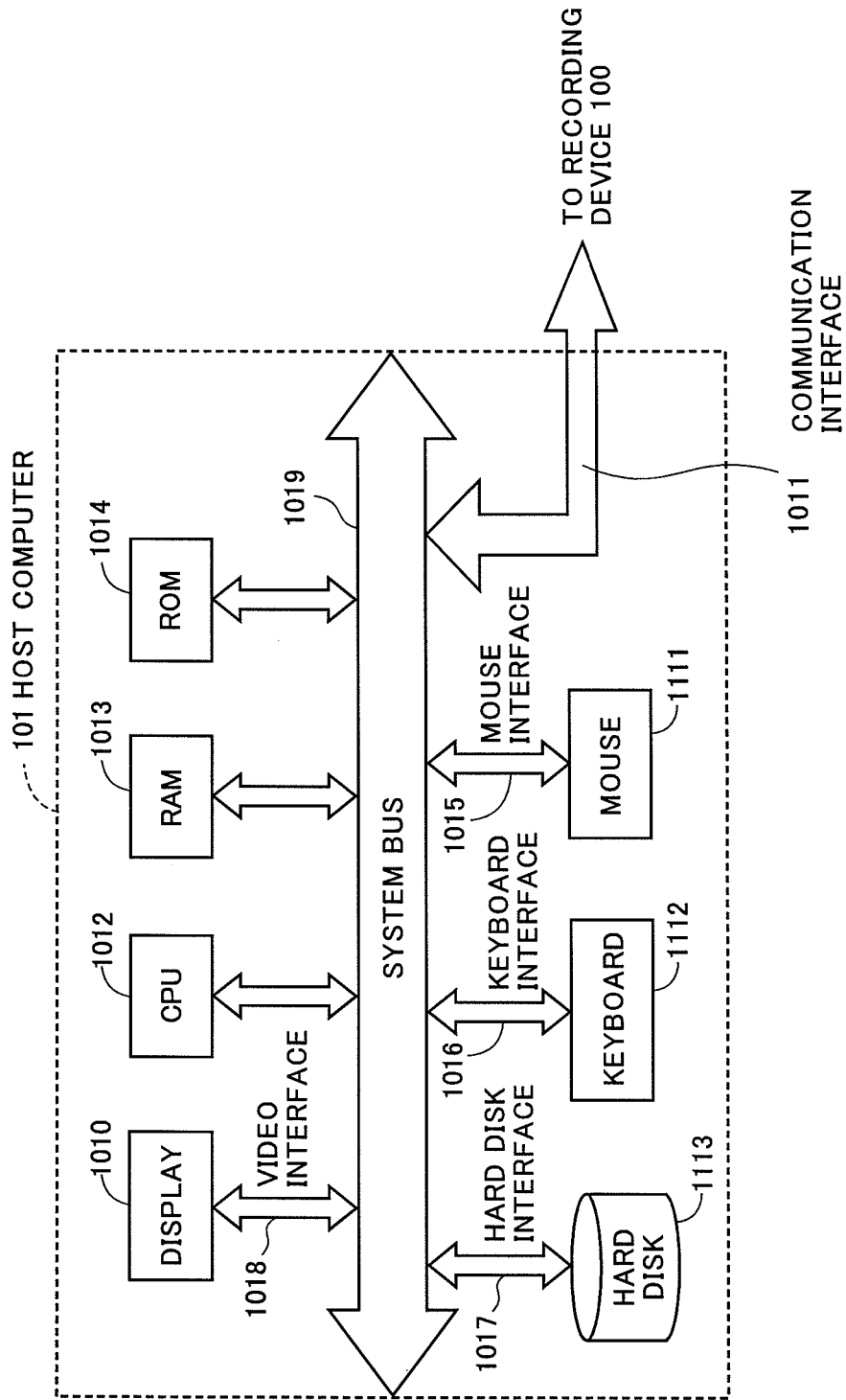
FIG. 4 is a block diagram showing an example of the internal configuration of the host computer shown in FIG. 1.

FIG. 4 shows an example of the internal configuration of the host computer 101 shown in FIG. 1. In this embodiment, the host computer 101 executes an image-data generation application (program) and the recording control program (printer driver) under control of the operating system. In this example, "Windows (registered trademark)" is used as the operating system. More specifically, the host computer 101 comprises a CPU (Central Processing Unit) 1012 that constitutes a controller for controlling various types of control operations, a RAM (Random Access Memory) 1013 that is used as a memory for a work area and a temporary memory area for the CPU 1012, and a ROM (Read Only Memory) 1014 that is a non-volatile memory for storing therein the boot program executed at initialization time by the CPU 1012. They are interconnected via a system bus 1019. A display 1010 includes a display device connected to the system bus 1019 via a video interface 1018. A keyboard 1112 is an operation unit connected to the system bus 1019 via a keyboard interface 1016. A mouse 1111 is one type of pointing device connected to the system bus 1019 via a mouse interface 1015. A hard disk drive 1113 is a large-capacity external storage device connected to the system bus 1019 via a hard disk interface 1017 for storing therein the operating system and various types of programs. The system bus 1019 is connected to the recording device 100 described above via a communication interface 1011. This communication interface 1011 corresponds to the cable 102 shown in FIG. 1.

For the host computer 101 to control the recording device, the program is loaded from the hard disk drive 1113 to the RAM 1013 for execution by the CPU 1012.

Figure 5:
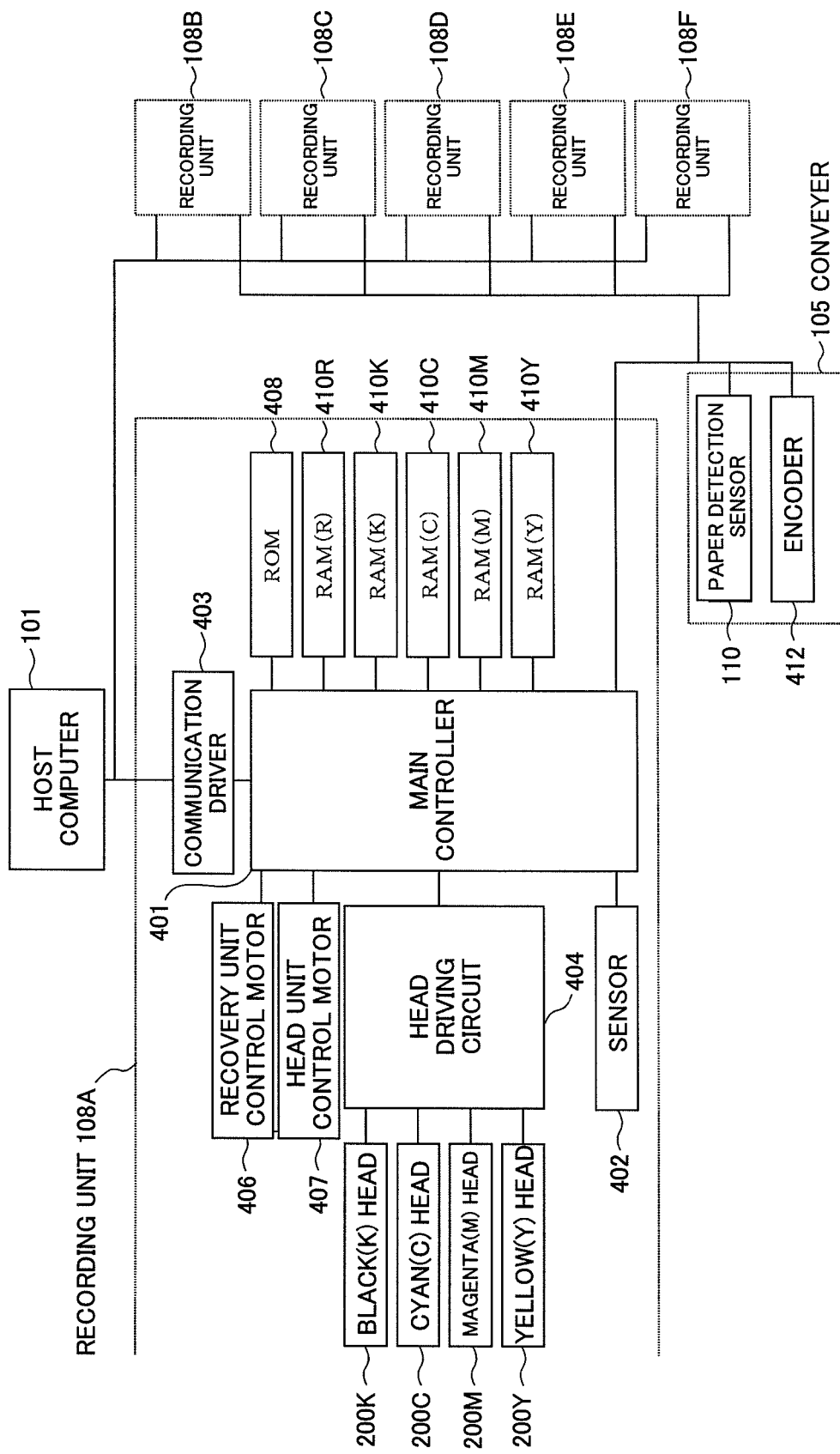
FIG. 5 is a block diagram showing the general hardware configuration for controlling the recorder of the recording device shown in FIG. 1.

FIG. 5 is a block diagram showing the general hardware configuration for controlling the recorder 106 of this recording device.

The host computer 101 transfers divided recording image data, generated by dividing the whole recording image into plural pieces each corresponding to one of the recording unit 108A-108F, to the respective recording units 108 and instructs them to start recording. The host computer 101 can also transfer a paper setting command to the recording units 108 to indicate the number of sheets, the type, and the size of the recording paper 103 to be printed.

Each recording unit 108 has a main controller 401 that executes the control program stored in a ROM 408 to perform the control operation described below. The ROM 408 may have a non-volatile storage area in which data such as various parameters are rewritten. The correction values or adjustment values, which will be described below, can be saved in this storage area.

The main controller 401 receives output signals from a sensor 402 that include various sensors.

The recording unit 108 controls communication with the host computer 101 via a communication driver 403 and receives a command from the host computer 101.

The recording unit 108 expands received image data into the bit-mapped form and draws it in the RAM 410K, 410C, 410M, and 410Y as color component image data. The parameter setting command for specifying the number of sheets to be printed or a paper type is stored in a RAM 410R. After the recording data is expanded into the RAM 410K, 410C, 410M, 410Y, and 410R, a head unit control motor 406 and a recovery unit control motor 407 move recording heads 200K, 200C, 200M, and 200Y to the recordable positions.

The recording unit 108 calculates the recording start time based on the signal from the paper detection sensor 110 that detects recording paper received from the conveyer 105 and the signal from an encoder 412 also received from the conveyer 105. After the recording is started, the main controller 401 sequentially reads corresponding color image data from the RAM 410K, 410C, 410M, and 410Y in synchronization with the signal from the encoder 412 and, via a head driving circuit 404, outputs the image data to recording heads 200K, 200C, 200M, and 200Y, from which the corresponding color inks are ejected, for recording.

In this way, each of the recording heads 200K, 200C, 200M, and 200Y ejects ink according to the image data of the received divided recording image to form a color image.

Figure 6:
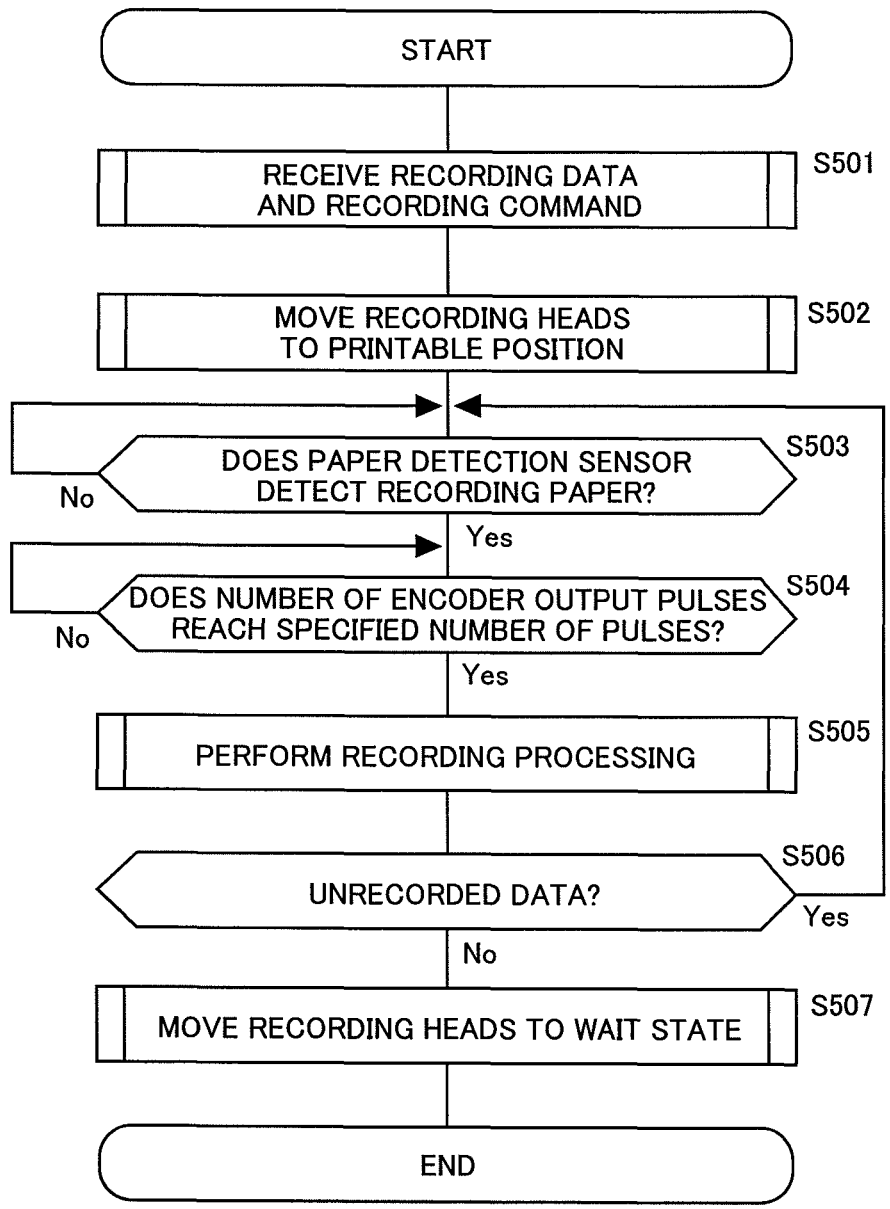
FIG. 6 is a flowchart showing the control of recording on recording paper by the recording device shown in FIG. 1.

FIG. 6 is a flowchart showing the control flow of recording on recording paper on the recording device in this embodiment. The main controller 401 reads the program from the ROM 408 to perform this processing. The main controller 401 also reads the program from the ROM 408 to perform the processing in FIG. 7 that will be described below.

The recording unit 108 receives the recording image information (recording data), in conjunction with the parameters specifying the number of recording sheets and paper size as well as the recording instructing command, from the host computer 101 (S501).

After receiving the recording data, the recording heads 200 are moved to the recordable positions (S502). After that, when a sheet of recording paper 103 is fed from the paper feeder 104 and is conveyed by the conveyer 105, the paper detection sensor 110 mounted on the conveyance path detects the recording paper (S503). After detecting the recording paper, the recording unit 108 waits until the number of pulses output from the encoder 412 of the conveyer 105 reaches a specified number (S504). This elapsed time corresponds to the period of time during which the recording paper is conveyed from the paper detection sensor 110 to the positions of the recording heads 200. After that, the recording heads 200 eject ink in synchronization with the output pulse from the encoder according to the recording image information. The recording processing is performed in this way (S505).

The processing described above is repeated for all received information until the specified number of recording sheets is reached. When the specified number of recording sheets is reached and there is no more unrecorded information (S506), the recording heads 200 are moved to the standby state (S507).

Figure 7:
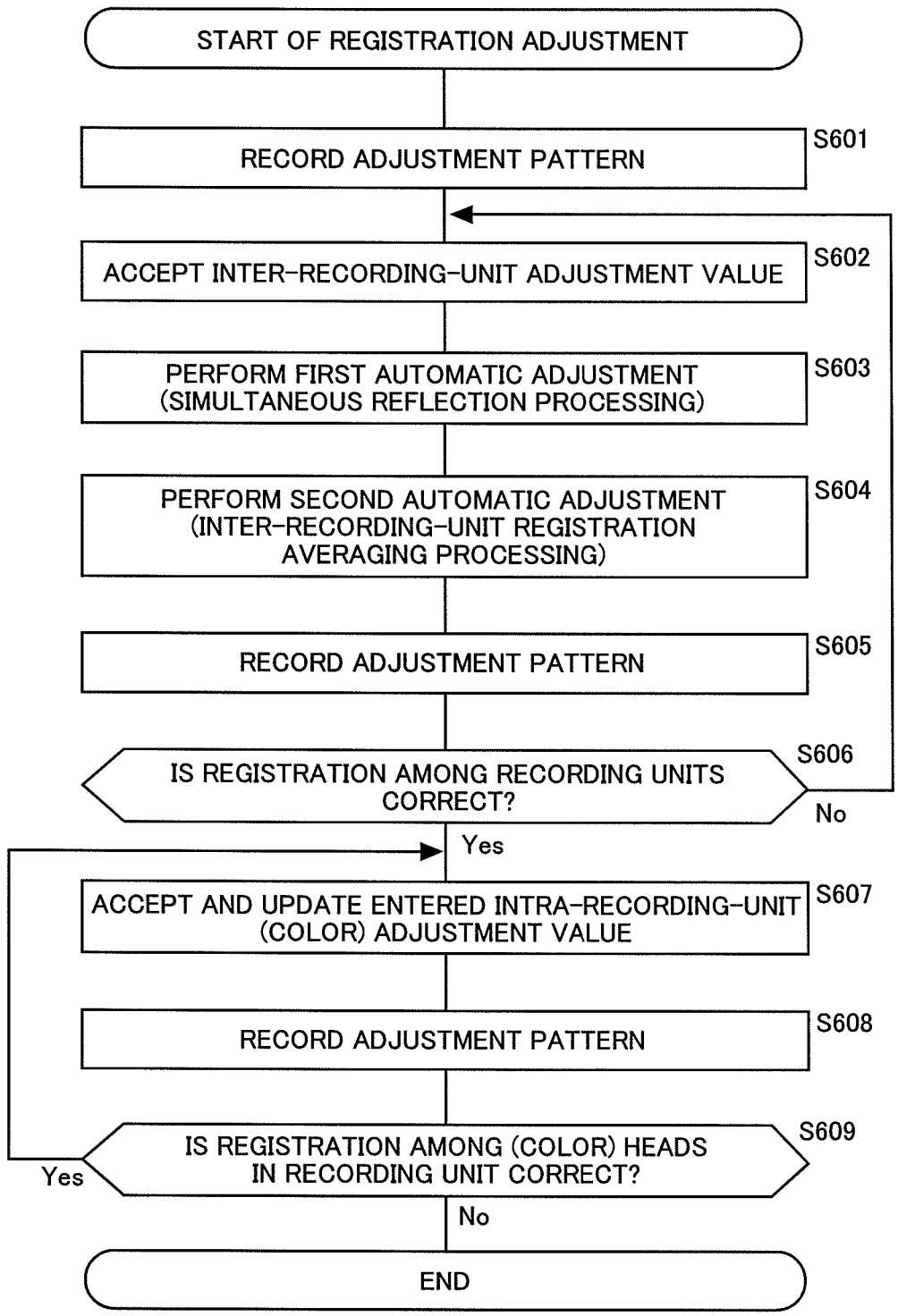
FIG. 7 is a flowchart showing the flow of registration adjustment in the embodiment of the present invention.

Next, the following describes the registration adjustment flow in this embodiment with reference to the flowchart in FIG. 7. Before describing the registration adjustment processing, the following describes the registration adjustment pattern (test pattern) used in this embodiment with reference to FIG. 8 and FIG. 9.

Figure 8:
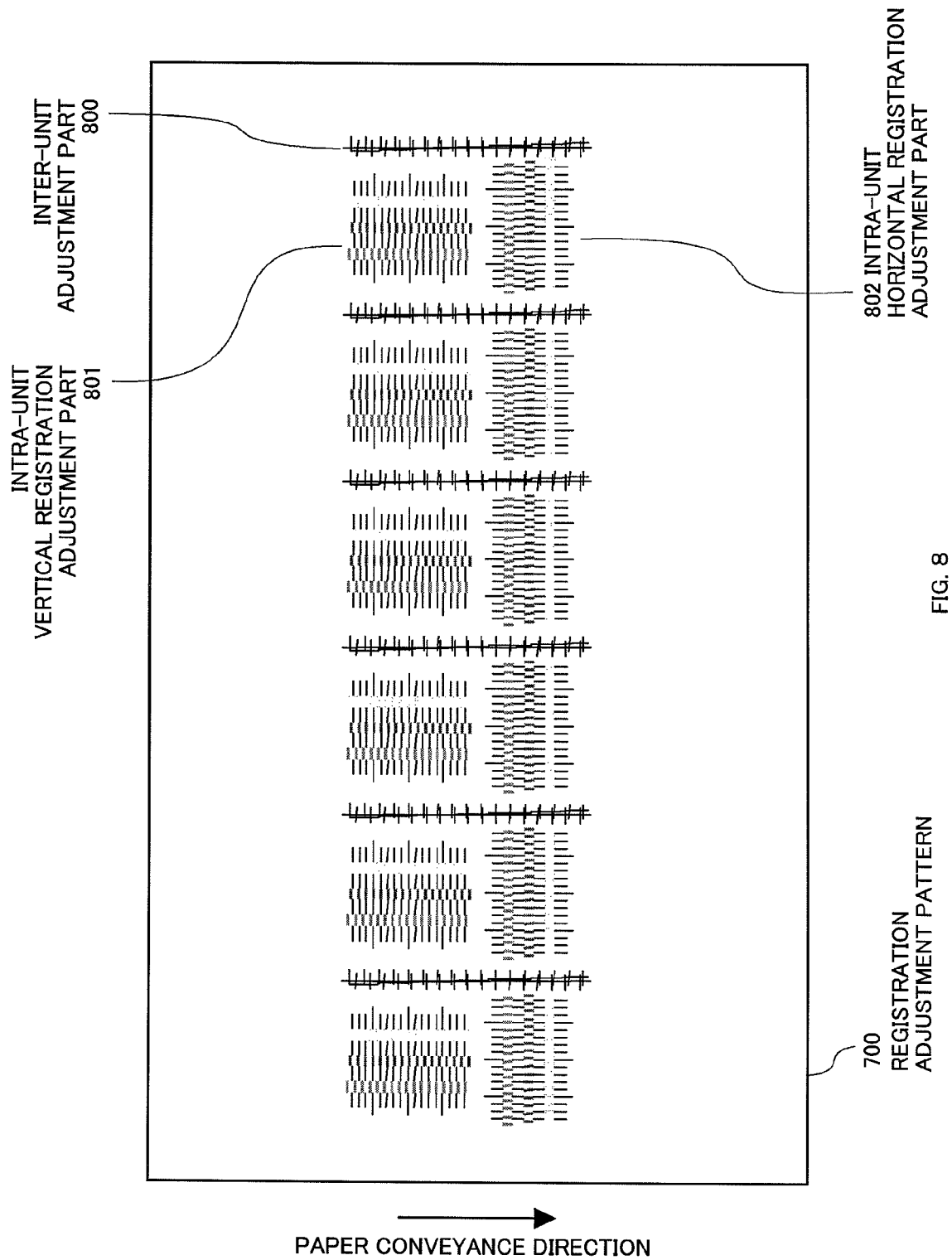
FIG. 8 is a diagram showing the whole image of a registration adjustment pattern used in the embodiment of the present invention.

FIG. 8 shows the whole image of a registration adjustment pattern 700, and FIG. 9 shows an enlarged image of a part of the whole image. Each recording unit may store the image data pattern part of the registration adjustment pattern 700 corresponding to that recording unit and record the stored pattern part using its control program; alternatively, the host computer 101 may store the image data of the pattern therein and instruct each recording unit to record the corresponding part of the pattern.

The registration adjustment pattern 700 includes an inter-unit adjustment part 800, an intra-unit vertical registration adjustment part 801, and an intra-unit horizontal registration adjustment part 802 for each recording unit. In this specification, the "vertical direction" refers to the direction in which the paper is conveyed, and the "horizontal direction" refers to the direction orthogonal to the paper conveyance direction. The inter-unit adjustment part 800 is a pattern part for detecting errors in positional relationship between the reference recording unit of the plural recording units and respective ones of other recording units. The intra-unit vertical registration adjustment part 801 is a pattern part for detecting errors in vertical positional relationship between the reference recording head of the plural recording heads in a recording unit and respective ones of other recording heads of the recording unit. The intra-unit horizontal registration part 802 is a pattern part for detecting errors in horizontal positional relationship between the reference recording head of the plural recording heads in a recording unit and respective ones of other recording head of the recording unit.

Basically, the registration adjustment pattern 700 is composed of plural sets of bars (called comparison bars) that are recorded by adjustment recording heads by minutely shifting from a bar (called a reference bar) by a unit adjustment amount that differs among the adjustment recording heads.

The inter-unit adjustment part 800 is recorded in the end areas of two heads of two neighboring recording units that are overlapping with each other where the black head being one of the neighboring recording units (right-hand neighbor in FIG. 2 in this example) is the reference head and the other black head is the comparison head. In this example, seventeen sets of vertical bars and horizontal bars, which are the reference bars, are recorded by the reference head in the conveyance direction at an interval and, at the same time, plural comparison vertical bars and plural comparison horizontal bars are recorded by the comparison head at the position shifted from the reference bar by the shift amount of 0 and at the positions sequentially shifted from the reference bar in one to eight increments of a unit amount in the positive and negative directions in the vertical and horizontal directions. If the registration of the comparison head with the reference head is correct, the vertical bars or the horizontal bars should match at the position of the numeric value of 0. If the registration of the comparison head with the reference head is not correct, the vertical bars or the horizontal bars match at a position corresponding to one of the nonzero shift amounts.

The intra-unit vertical registration adjustment part 801 is generated by recording, with the reference head (K), four sets of 17 parallel horizontal bars 801*a* at an interval, with the four sets sequentially shifted horizontally in increments of a predetermined amount. In addition, in the three spaces in the columns of the horizontal bars 801*a*, other the horizontal bars are recorded, one for each space, using the comparison heads (C, M, Y). The horizontal bars, recorded using the comparison heads, are recorded by shifting the bars in one to eight increments of a unit adjustment amount, in the positive and negative directions. If the vertical registration of the comparison heads with the reference head is correct, the horizontal bars should match at the position of the numeric value of 0. If the vertical registration of the comparison heads with the reference head is not correct, the horizontal bars match at a position corresponding to one of the nonzero shift amounts.

Similarly, the intra-unit horizontal registration adjustment part 802 is generated by recording, with the reference head (K), four sets of 17 parallel vertical bars 802*a* at an interval, with the four sets sequentially shifted vertically by a predetermined amount. In addition, in the three spaces in the rows of vertical bars 802*a*, the vertical bars are recorded, one for each space, using the comparison heads (C, M, Y). The vertical bars, recorded using the comparison heads, are recorded by shifting the bars in one to eight increments of a unit adjustment amount, in the positive and negative directions. If the horizontal registration of the comparison heads with the reference head is correct, the vertical bars should match at the position of the numeric value of 0. If the horizontal registration of the comparison heads with the reference head is not correct, the vertical bars match at a position corresponding to one of the nonzero shift amounts.

Therefore, the user can visually inspect the recorded registration adjustment pattern 700 to confirm the position of any comparison bar that matches the reference bar. The numeric value corresponding to the matching comparison bar indicates the amount of error of the recording head (comparison head), which recorded the comparison bar, from the correct position with respect to the recording head (reference head) which recorded the reference bar. The numeric value of 0 of a comparison bar that matches the reference bar indicates that the comparison head is at correct position with respect to the reference head.

The host computer can send a registration adjustment pattern recording command to the recording device 100 to cause the recorder 106 to record the registration adjustment pattern 700.

To perform the processing of the flowchart in FIG. 7 in this embodiment, the CPU 1012 (FIG. 4) in the host computer 101 reads the control program from the ROM 1014 or the hard disk drive 1113.

First, the recording device 100 records the registration adjustment pattern 700 (S601). With the help of the user, the recording device 100 first adjusts the registration among recording units and then adjusts the registration of the heads in each recording unit.

To adjust the registration among recording units, the recording system requests the user to check the inter-unit adjustment part 800 and accepts numeric values of the line (bar) matching part (inter-recording-unit adjustment value) entered from the input unit of the host computer 101 (S602). In the example in FIG. 9, the numeric values of the matching bars are "conveyance direction +3" (803) and "horizontal direction−1 (804)". An adjustment value is set from a predetermined unit of the plural recording units. For example, with a recording unit 108F as the reference unit, the host computer 101 sets adjustment value sequentially in the neighboring recording units. In this case, the first automatic adjustment processing and the second automatic adjustment processing are performed (S603, S604). The first automatic adjustment processing is the linked reflection processing that will be described below. The second automatic adjustment processing is the registration averaging processing among recording units. The registration of the reference head of each recording unit is updated by an adjustment value obtained by the second automatic adjustment processing.

Figure 10:
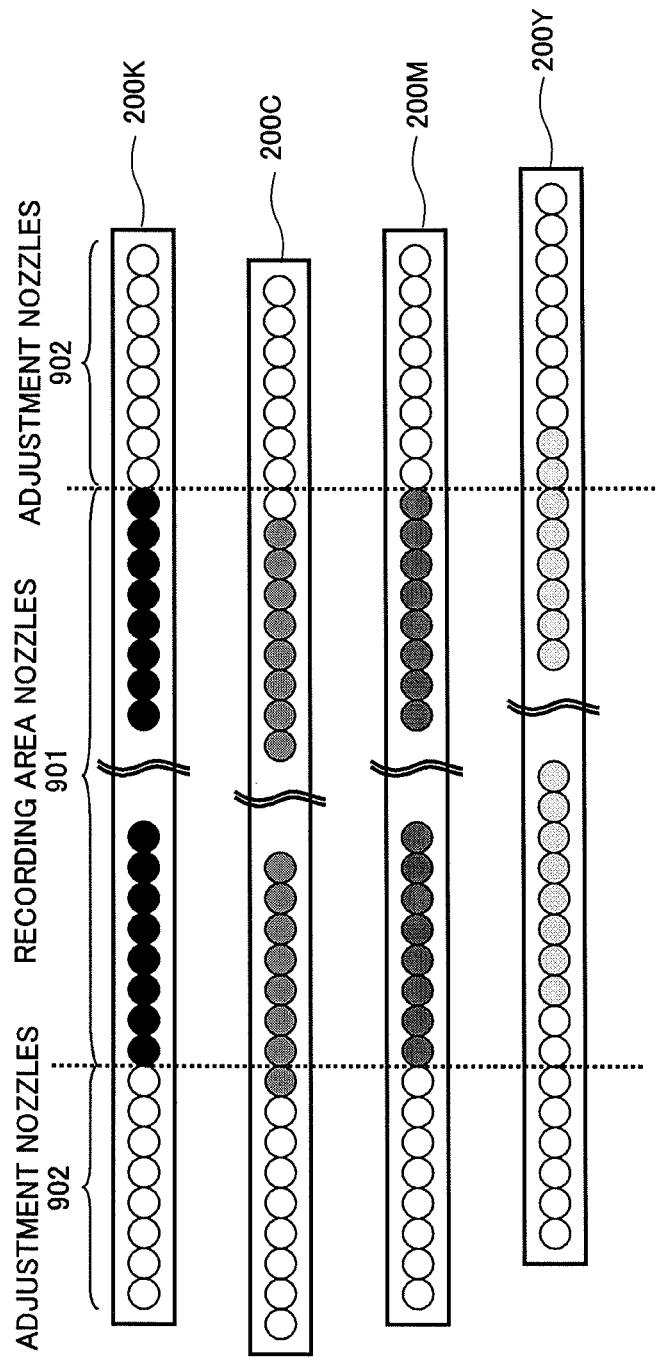
FIG. 10 is a diagram showing the general head-width direction (horizontal) registration adjustment in a line-type recording unit.
Figure 11:
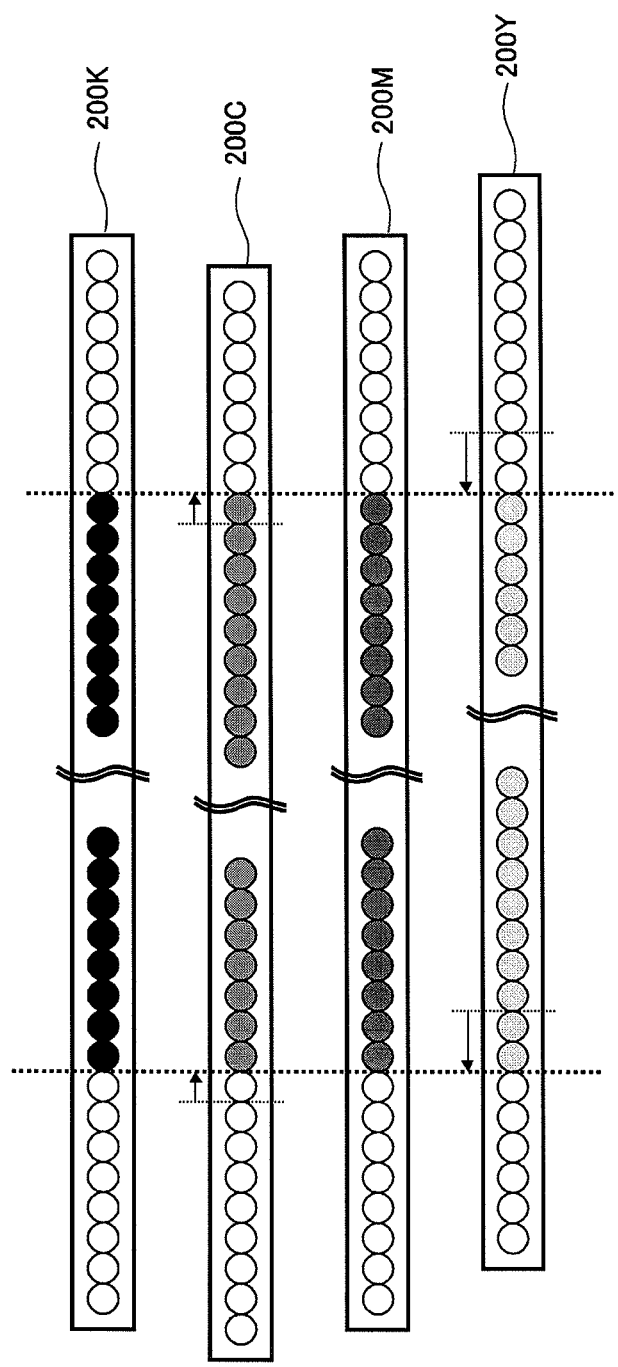
FIG. 11 is a diagram continued from FIG. 10.
Figure 12A:
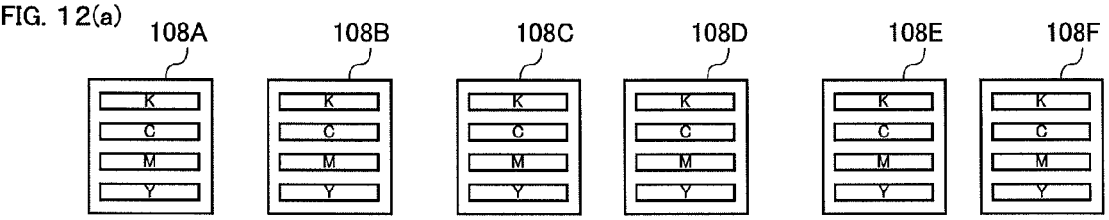
FIG. 12 is a diagram showing the first automatic adjustment processing of registration adjustment value correction processing in this embodiment.
Figure 12B:
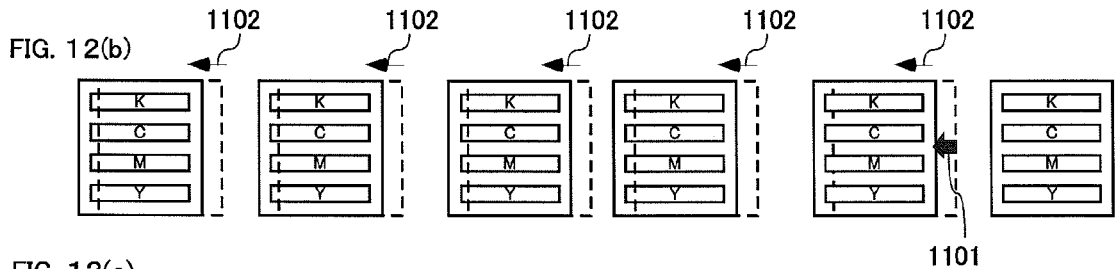
Figure 12C:
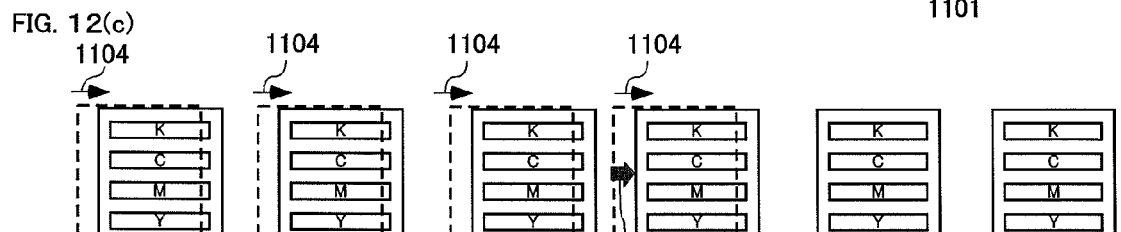
Figure 12D:
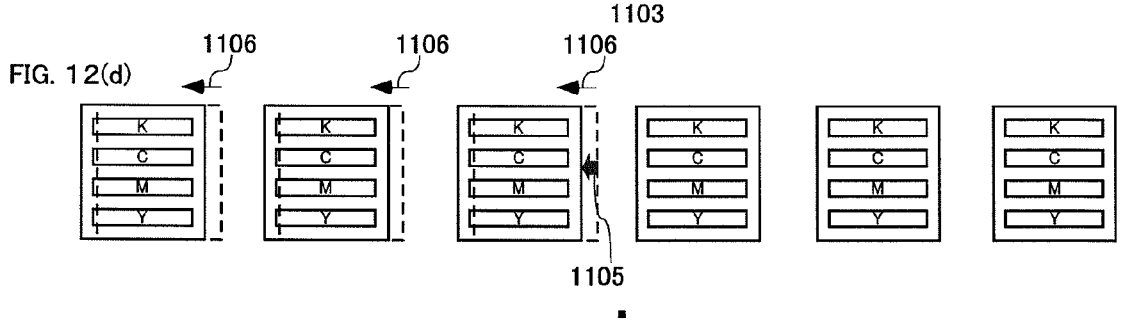

Before describing the first automatic adjustment processing, the following briefly describes the adjustment of general head-width-direction (horizontal) registration (hereinafter called horizontal registration) in a line-head type recording unit with reference to FIG. 10 and FIG. 11.

In general, a line-type recording head 200 has nozzles 901, which have the width corresponding to the width of the recording area, as well as adjustment nozzles 902, composed of a predetermined number of dots, on the left and right sides of the head. The total number of nozzles including the adjustment nozzles 902 is larger than the number of nozzles required for the actual recording area width by the predetermined number of dots. Therefore, the actual effective-recording area, from the starting nozzle to the ending nozzle, can be selectively specified from all nozzles of the recording head 200 including the right and left adjustment nozzles 902. This selective setting allows the horizontal recording positions to be adjusted without physically moving the recording head. For example, when the recording heads 200K (black), 200C (cyan), 200M (magenta), and 200Y (yellow) are mounted and the mounting positions of those four recording heads are shifted each other as shown in FIG. 10, the recording nozzles of the cyan head 200C and the yellow head 200Y can be changed as shown in FIG. 11 to adjust the horizontal registration so that the horizontal effective recording areas of the recording heads match. This function absorbs a physical mounting error in the recording units.

The registration among the recording units can be adjusted through the horizontal registration adjustment of the black heads that are the reference recording heads of the recording units. That is, with respect to the black head of the reference recording unit, the black heads of other recording units are horizontally adjusted to adjust the registration of plural recording units. However, note that, if the horizontal registration adjustment of a black head has changed the recording area of the black head, the other color heads must also be adjusted horizontally the same amount simultaneously based on that black head.

The final registration adjustment value obtained as described above is sent from the host computer 101 to the recording device and is saved in the storage unit in each recording unit. The saved registration value is referenced when recording is performed, for the registration adjustment.

The following describes the first automatic adjustment processing with reference to FIGS. 12(*a*)-12(*d*). Basically, the adjustment between the recording unit 108F and the recording unit 108E requires the recording of another adjustment pattern in which the adjustment value is reflected, and the adjustment between the recording unit 108E and the recording unit 108D requires the recording of still another adjustment pattern. That is, when the registration among plural recording units is adjusted, each adjustment requires the recording of an adjustment pattern. This is very irksome.

To solve this problem, the present invention uses the following method. When a black head adjustment value (1101) of the recording unit 108E is entered in the initial state of all recording units, such as the one shown in FIG. 12(*a*), to adjust the registration between the recording unit 108E and the recording unit 108F, which is the reference, as shown in FIG. 12(*b*), the method according to the present invention reflects the same adjustment value simultaneously also in the recording units 108D-108A (1102). This keeps the mutual positional relation among the recording units 108A-108E unchanged.

Although, for convenience of explanation, the recording units are shifted horizontally to adjust the positions among the recording units in FIGS. 12(*a*)-12(*d*), the effective range (effective recording range) of the rows of nozzles, not the physical positions of the recording units, are actually shifted as described above.

Next, when an adjustment value 1104 is entered to adjust the registration between the recording unit 108E, which is the reference, and the recording unit 108D as shown in FIG. 12(*c*) (1103), the same adjustment value is applied not only to the recording unit 108D but also to all subsequent recording units 108C-108A. Next, when an adjustment value 1106 is entered to adjust the registration between the recording unit 108D, which is the reference, and the recording unit 108C as shown in FIG. 12(*d*) (1105), the same adjustment value is applied not only to the recording unit 108C but also to all subsequent recording units 108B-108A.

Repeating such a processing allows the user to apply a value, read out of the registration adjustment pattern, directly to a recording unit which is compared with the reference recording unit and, at the same time, to adjust the recording units subsequent to the recording unit, which is compared with the reference recording unit, by simply applying the same adjustment value simultaneously to those subsequent recording units. Another advantage of this method is that the time and energy for adjustment is saved because the registration adjustment pattern is recorded only once.

Figure 13:
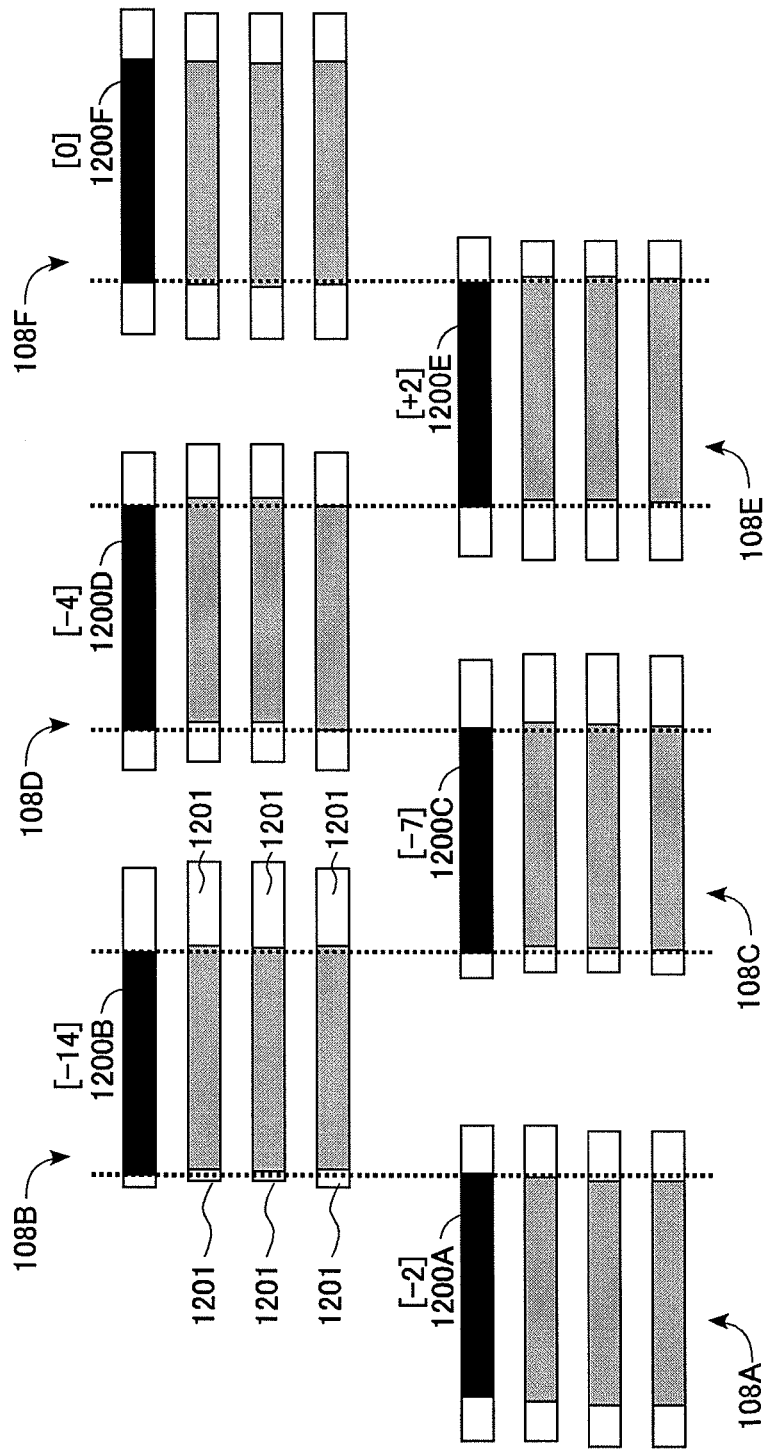
FIG. 13 is a diagram showing a problem in the first automatic adjustment processing in FIG. 12.

Once the inter-recording-unit registration adjustment value is set as described above, the recording system performs the second automatic adjustment processing. After the registration among the recording units is adjusted by adjusting the horizontal registration of the black heads, which are the reference head of the recording units, as described above, the horizontal registration of the color heads in each recording unit is adjusted with the black head as the reference. Therefore, a large deviation in the adjustment value of the reference or black head will lead to a deviation in the adjustment range of the color heads and, in some cases, will prevent the adjustment from being made properly. For example, assume that the horizontal registration adjustment result of the black heads (1200A-1200F) is as shown in FIG. 13. A numeric value in brackets in the figure indicates an inter-unit registration adjustment value detected for each recording unit. Note that the adjustment value of the right-end recording unit 108F, which is the reference recording unit, is 0.

The color heads of other recording units are adjusted in the same manner. As the reference or black head in each recording unit is horizontally adjusted, the effective recording area of the color heads in that recording unit is adjusted for the amount equal to the adjustment amount of the black head, for example, as shown in the part 1201 in the recording unit 108B. However, because the effective recording area of all recording heads in the recording unit is also moved, the amount of deviation of the color heads with respect to the black head is not changed (maintained) in each recording unit.

In the example shown in FIG. 13, a large deviation produced as a result of the horizontal registration adjustment of the black head in the recording unit 108B is directly reflected in the color heads in the same recording unit. This direct reflection limits the range in which the color heads can be horizontally adjusted. That is, if the registration adjustment is required for one of the color heads in the recording unit 108B in the right direction in the figure with respect to the black head, the movable adjustment amount becomes extremely small. As a result, required horizontal registration cannot be performed in some cases.

Figure 14:
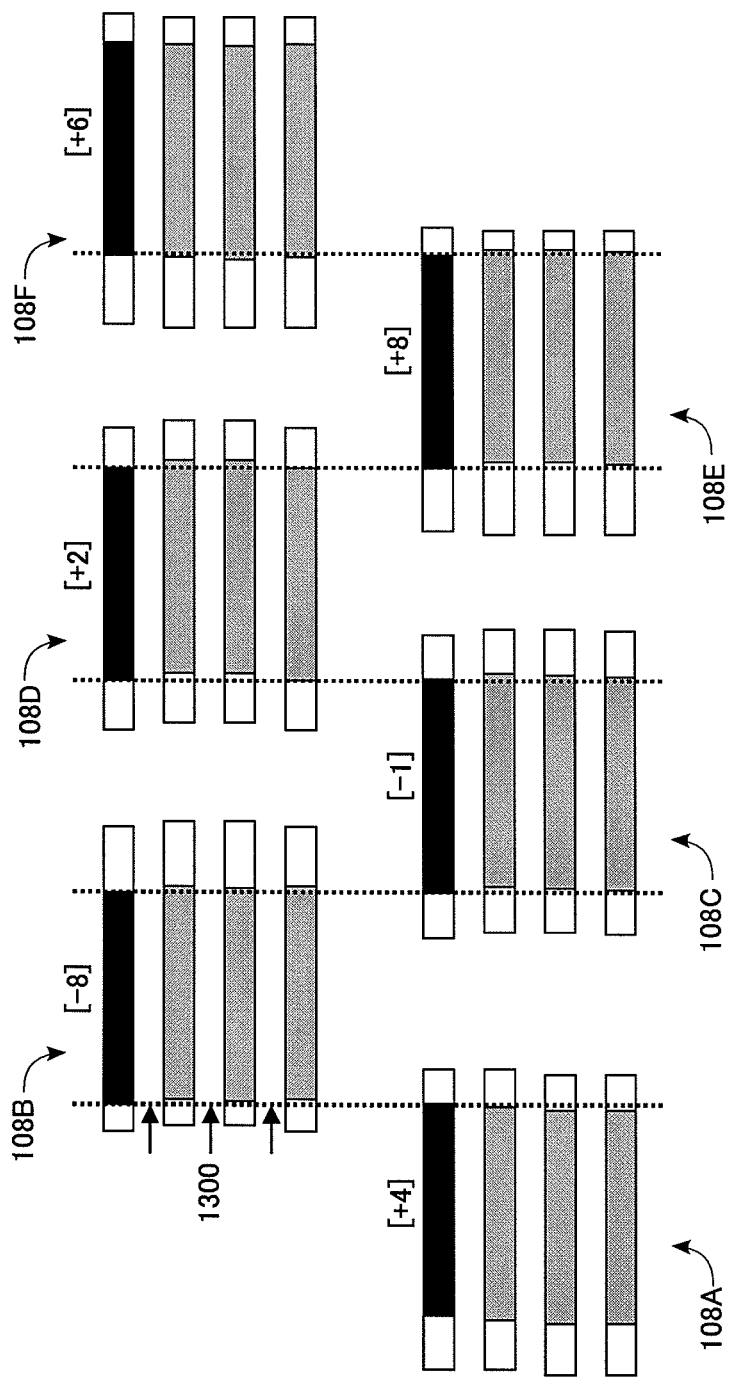
FIG. 14 is a diagram showing the result of a solution of the problem shown in FIG. 13.

The second automatic adjustment processing is provided to prevent a deviation in the adjustment range. To do so, the recording system calculates the average value from the maximum value and the minimum value of the adjustment values of the recording units, increases or decreases the adjustment values of all recording units by the calculated average value, and resets the adjustment values. However, note that, because this processing makes the adjustment values closer to 0,the actual shift direction is the direction opposite to the sign of the average value. In the example shown in FIG. 13, the adjustment result of the recording unit 108B is the maximum, and the adjustment result of the recording unit 108E is the minimum. For example, if the adjustment value of the recording unit 108B is −14 and the adjustment value of the recording unit 108E is +2,the average value is −6 and, therefore, the adjustment values of all recording units are shifted six dots in the positive direction. FIG. 14 shows the result. While the horizontal adjustable range of the color heads of the recording unit 108B was extremely small before the shift, the result shown in FIG. 14 indicates that the horizontal adjustable range is improved by shifting all the recording heads of all recording units by the correction value indicated by 1300.

Referring back to FIG. 7, the recording system records the registration adjustment pattern again after the second automatic adjustment ends (S605). If the adjustment described above is made correctly, the inter-unit adjustment part 800 should indicate that the reference line and the comparison line overlap at the scale position of 0 for all recording units. From this viewpoint, the user is requested to check that the registration has successfully been adjusted the recording units (S606). This check is performed based on an input from the user who has visually checked if the registration is correctly adjusted.

If the registration among the recording units is adjusted correctly, the recording system next adjusts the registration among the recording heads in each recording unit. The recording system accepts the input of the numeric value (adjustment value) of the position where the straight line recorded by the black head, which is the reference head, and the line (bar) recorded by the other recording heads (color heads) match as, shown in FIG. 10 and FIG. 11, and updates the registration adjustment value of the color heads (S607).

During the second automatic adjustment processing shown in FIG. 14, the amounts of errors of the color heads with respect to the black head in each recording unit shown in FIG. 13 remain unchanged. That is, though the error among the recording units shown in the adjustment pattern recorded in step S605 in FIG. 7 is assumed to be 0,the amount of errors of the color heads with respect to the black head in each recording unit must be the same as that in the adjustment pattern recorded in step S601. This means that the adjustment pattern recording in step S605, performed just for confirming that the adjustment among the units has been done correctly, is not always necessary. The intra-recording-unit adjustment value entered in step S607 may be the value confirmed in the adjustment pattern recorded in step S601 (This value may be the adjustment value confirmed in the adjustment pattern recorded in step S606, but both values are the same).

Finally, the recording system records the registration adjustment pattern again (S608) to check that the registration of heads in the recording unit has been adjusted correctly (S609). The system accepts the input from the user indicating whether or not the visual checking is correct. If the registration is adjusted correctly, all registration adjustment tasks end. The checking in step S609 is not always required either but is optional.

As apparent from the description above, the adjustment values entered in step S602 and S607 can also be entered at a time based on one adjustment pattern recorded in step S601. The final value of the color head adjustment of each recording unit can be found by a simple calculation in which the color head adjustment value is added to the sum of the adjustment value of the black head in the recording unit obtained by the simultaneous addition of the inter-recording-unit adjustment values of the recording units and the correction value for averaging.

The adjustment value correction described above can be made either by the host computer or by one of the recording units.

Although only the horizontal registration has been described above, the vertical (that is, paper conveyance direction) registration can be adjusted, not by selecting an area for the rows of nozzles of the recording heads, but by correcting the time at which all recording heads record images on conveyed paper. Note that the registration average processing described above is not necessary for the vertical direction because there is no limit on the adjustment value as in the horizontal direction.

As described above, the recording device in this embodiment, which has plural recording units for recording divided recording images on the same recording paper to form one recording image, allows the user to easily adjust the registration among the recording units or registration among the heads in a recording unit, thus providing a recording system that forms high-quality images.

Although, in the embodiment described above, the user checks a registration adjustment pattern recorded during the registration adjustment and determines an adjustment value, another system may be employed that has an image reader, such as a scanner, in the ejection unit of the recording device for automatically reading a recorded registration adjustment pattern via the image reader to determine an adjustment value. Such a system allows the user to adjust the registration of the recording device without a cumbersome adjustment task.

In either case, "adjustment value setting means" in the present invention is means for accepting the input of a numeric value entered by the user or the reader based on a recorded registration adjustment pattern, for calculating a final adjustment value based on the entered numeric value, and for setting the calculated final adjustment value in the recording units.

Although each recording unit in the above embodiment has four recording heads, the number of recording heads in one recording unit is not limited to four. For example, the method described above may be used to adjust the registration even when a reduced shade color recording head is added to increase the halftone level of recording images. In addition, though the reference head in a recording unit is the black head in the embodiment described above, another color head may also be used as the reference head. Plural black heads may also be used in a recording unit. The number of recording units is not limited to six either.

Although a recording device using the inkjet recording method has been described, the recording method is not limited to the inkjet method as long as each of plural recording units has plural line heads. The recording paper is not limited to sheet-like recording paper, but the recording device is applicable also to long label sheets or tag sheets.

The recording system in this embodiment uses the adjustment values, determined based on a registration adjustment pattern recorded on a sheet of recording medium, to allow the user to quickly adjust the registration of all recording units with a relatively small amount of work while ensuring consistency in the adjustment values. As a result, the user can easily adjust the registration and record high-quality images.

Figure 15:
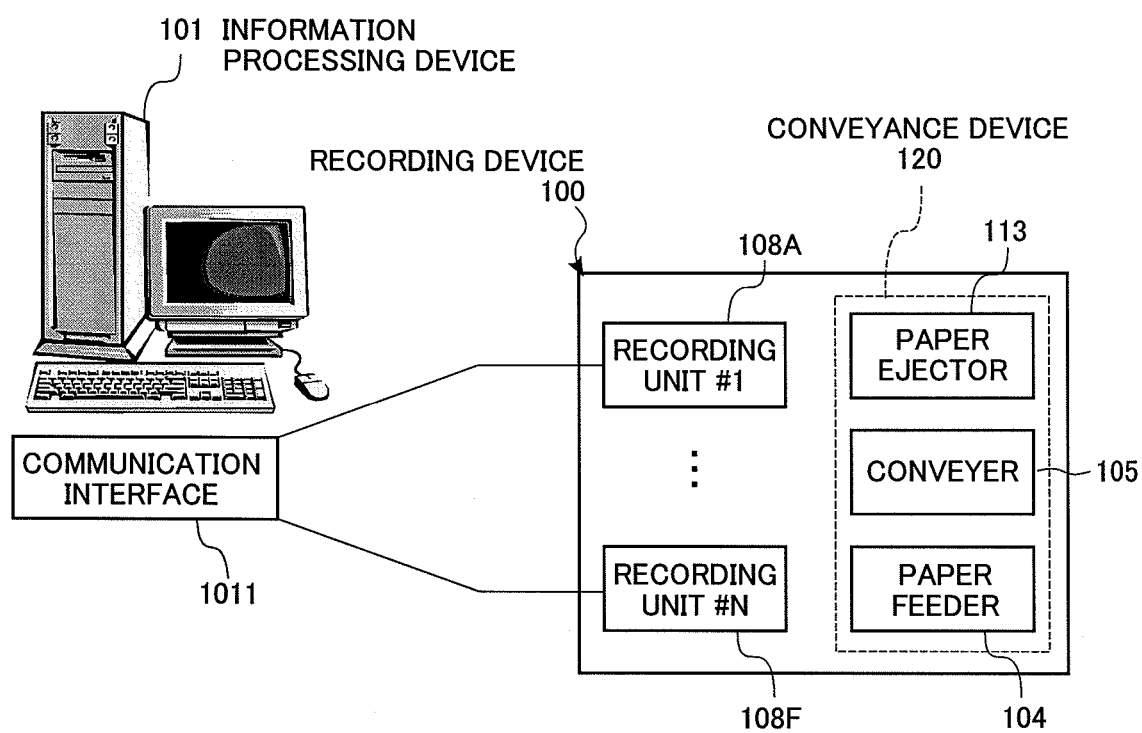
FIG. 15 is a diagram showing the general configuration of a recording system in another embodiment of the present invention.

FIG. 15 shows the general configuration of a recording system in another embodiment of the present invention. The same reference numerals are used to denote the same elements of the system shown in FIG. 1. This recording system comprises an information processing device 101 that generates information to be recorded and a recording device 100 that records this information on a recording medium. The information processing device 101 is connected to the recording device 100 via a communication interface 1011.

The information processing device 101 is a device (for example, a PC) that generates recording data for plural recording units and transfers the generated recording data to recording units 108A, . . . , 108F. In the description below, the recording units 108A, . . . , 108F are called a recording unit 108 when generically called.

The communication interface 1011 may be any interface via which the recording device 100 can be connected to the information processing device 101, for example, USB (Universal Serial Bus), IEEE1394 cable, and Ethernet (registered trademark) (10/100/1000BaseT). Although a wired communication interface is assumed in this embodiment, the wireless communication interface 1011 such as a wireless LAN or the like may also be used. When a network or the USB is used, the information processing device 101 may be connected to the recording units 108 via a hub.

The recording device 100 has plural (n) recording units 108A, . . . , 108F and a conveyance device 120 common to those recording units. The conveyance device 120 comprises a paper feeder 104 that picks up recording media, one sheet at a time, a conveyer 105 that conveys the picked-up recording medium to the recording unit, and a paper ejector 113 that ejects a recorded recording medium from the recording unit.

The information processing device 101 stores therein an image generation application and a recording control program (printer driver), which operate under control of the operating system, and performs the recording unit maintenance processing such as the status monitoring, head position adjustment, and cleaning of the recording units 108. Although "Windows (registered trademark)" is used as the operating system in this example, any other operating system may also be used.

When a life-expired recording unit 108 is replaced by a new recording unit or the color configuration of recording heads included in a recording unit is changed, it is necessary to acquire the configuration information on the recording heads of the newly mounted recording unit.

Figure 17:
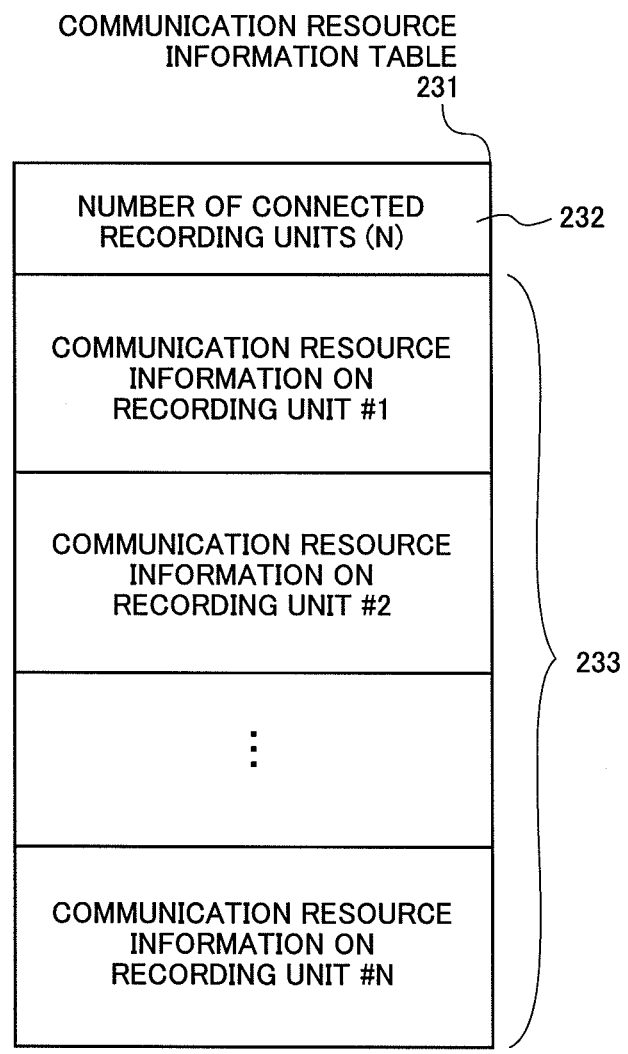
FIG. 17 is a diagram showing an example of the configuration of a communication resource information table used in the embodiment of the present invention.

The recording program stored in the information processing device 101, when executed, searches for the recording units 108 connected to the information processing device 101 via the communication interface 1011. Based on the search result, the recording program opens communication ports, one for each connected recording unit, acquires communication resource information on the recording units, and generates a communication resource information table 231, as shown in FIG. 17, if the same communication resource information is not found. The "communication resource information" is information on communication resources such as a port identifier, a port name, and a port symbol name.

Figure 16:
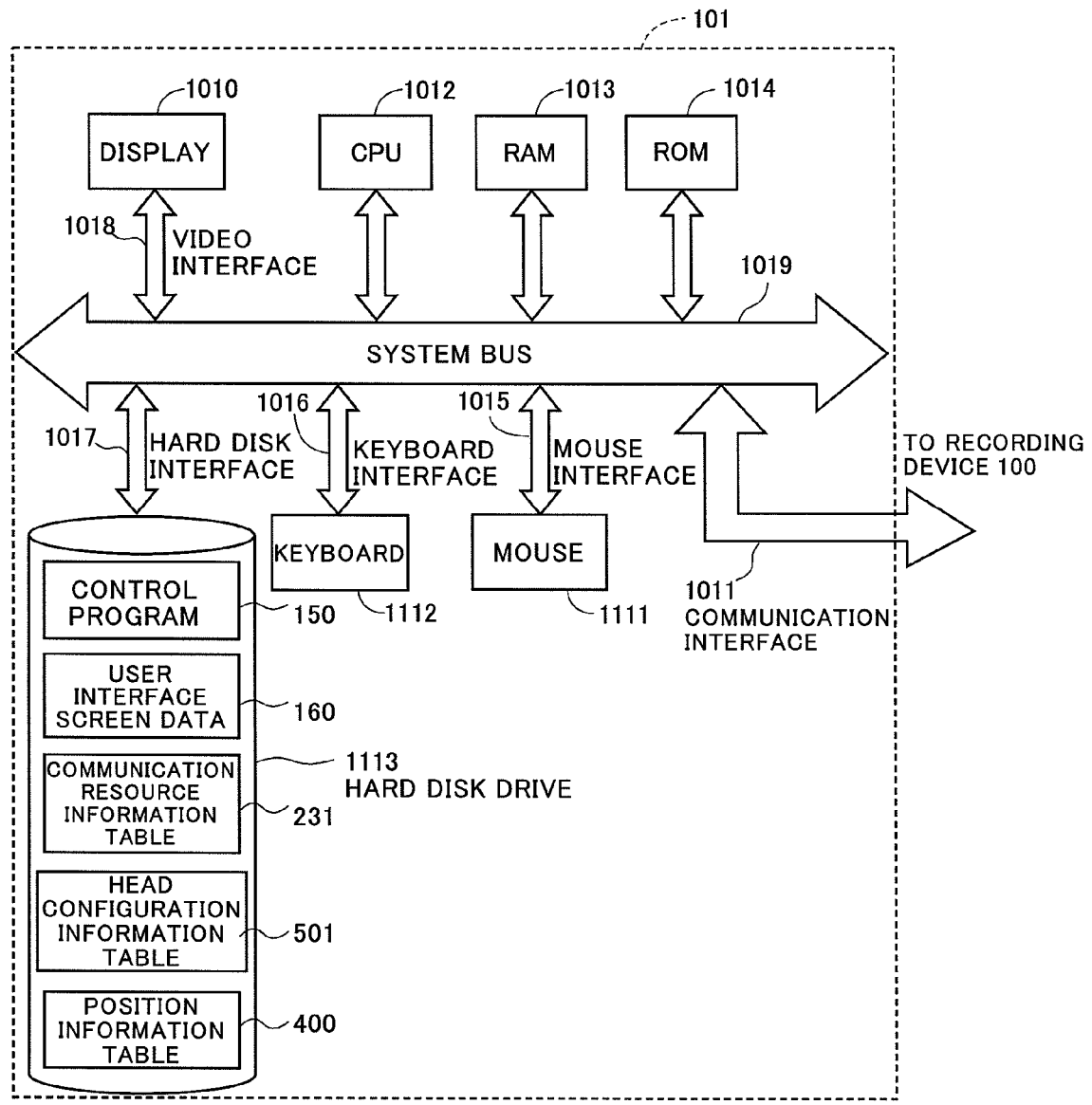
FIG. 16 is a diagram showing the general hardware configuration of an information processing device.

FIG. 16 is a diagram showing the general hardware configuration of the information processing device 101. This configuration is basically the same as the hardware configuration shown in FIG. 4, and the same reference numerals are used to denote the same elements.

In this embodiment, the information processing device 101 executes an image data generation application (program) and the recording control program (printer driver) under control of the operating system. More specifically, the information processing device 101 comprises a CPU (Central Processing Unit) 1012 that constitutes a controller for controlling various types of control operations, a RAM (Random Access Memory) 1013 that is used as a memory for a work area and a temporary storage area for the CPU 1012, and a ROM (Read Only Memory) 1014 that is a non-volatile memory for storing therein the boot program executed at initialization time by the CPU 1012. They are interconnected via a system bus 1019. A display 1010 includes a display device connected to the system bus 1019 via a video interface 1018. A keyboard 1112 is an operation unit connected to the system bus 1019 via a keyboard interface 1016. A mouse 1111 is one type of pointing device connected to the system bus 1019 via a mouse interface 1015. A hard disk drive 1113 is a large-capacity external storage device connected to the system bus 1019 via a hard disk interface 1017 for storing therein the operating system and various types of programs. The system bus 1019 is connected to the recording device 100 via a communication interface 1011.

For the information processing device 101 to control the recording device 100, a control program 150 is loaded from the hard disk drive 1113 into the RAM 1013 for execution by the CPU 1012.

In this embodiment, a registration adjustment pattern 700, which is a registration adjustment test pattern that will be described below, is stored in each recording unit according to the configuration of the recording unit. Alternatively, the registration adjustment patterns may be stored in the information processing device separately, one for each recording device, according to the recording device configuration that differs among the recording devices.

The hard disk drive 1113 also stores screen data 160 constituting a user interface screen (FIG. 22) that will be described below. The hard disk drive 1113 also stores the communication resource information table 231, a head configuration information table 501, and a position information table 400.

An example of the internal configuration of a recording unit 108, which is a part of the recording device 100 in FIG. 15, is as shown in FIG. 5.

The information processing device 101 transfers recording image data, generated by dividing image data into plural pieces (six in this example) according to the plural recording units 108A-108F, to respective recording units 108 and instructs them to start their recording processing. The information processing device 101 can also send a paper setting command, which specifies the number of sheets, the type, and the size of recording paper on which the image is to be printed, to respective recording units 108 and instructs them to start their recording processing.

Each recording unit 108 has a main controller 401 that executes the control program, stored in the ROM 408, to perform the control operation described below. The ROM 408 may have a nonvolatile storage area in which data such as parameters can be rewritten. The correction values and adjustment values, which will be described below, are saved in this storage unit.

The main controller 401 also receives the output signals of a sensor 202 including various types of sensors.

The recording unit 108 controls communication via a communication driver 403 to receive a command from the information processing device 101.

The recording unit 108 expands received image data into the bit-mapped form and draws it in the RAM 410K, 410C, 410M, and 410Y as color component image data. The parameter setting command for specifying the number of sheets to be printed or a paper type is stored in a RAM 410R. After the recording data is expanded into the RAM 410K-410R, a head unit control motor 206 and a recovery unit control motor 207 move recording heads 200K-200Y to the recordable positions.

The recording unit 108 calculates the recording start time based on the signal from the paper detection sensor 110 that detects recording paper received from the conveyer 120 and the signal from an encoder 412 also received from the conveyer 120. After the recording is started, the main controller 401 sequentially reads corresponding color image data from the RAM 410K, 410C, 410M, and 410Y in synchronization with the signal from the encoder 412 and, via a head driving circuit 404, outputs the image data to recording heads 200K-200Y, from which the corresponding color ink is ejected, for recording.

In this way, each of the recording heads 200K-200Y ejects ink according to the image data of the received divided recording image to eject a color image.

FIG. 17 shows an example of the configuration of the communication resource information table 231 used in this embodiment. This communication resource information table 231 is stored in a predetermined storage unit (for example, RAM or hard disk) in the information processing device. This table contains the number of connected recording units 232 constituting the recording device 100 and communication resource information 233 on each recording unit. As described above, the port identifier, the port name, and the port symbol name are defined by the communication resource information.

To allow the information processing device 101 to transfer recording data divided for recording by each of the recording units, the position information on the recording units of the recording device 100 is notified from the recording units to the information processing device 101. This position information is stored in the position information table 400.

Figure 18:
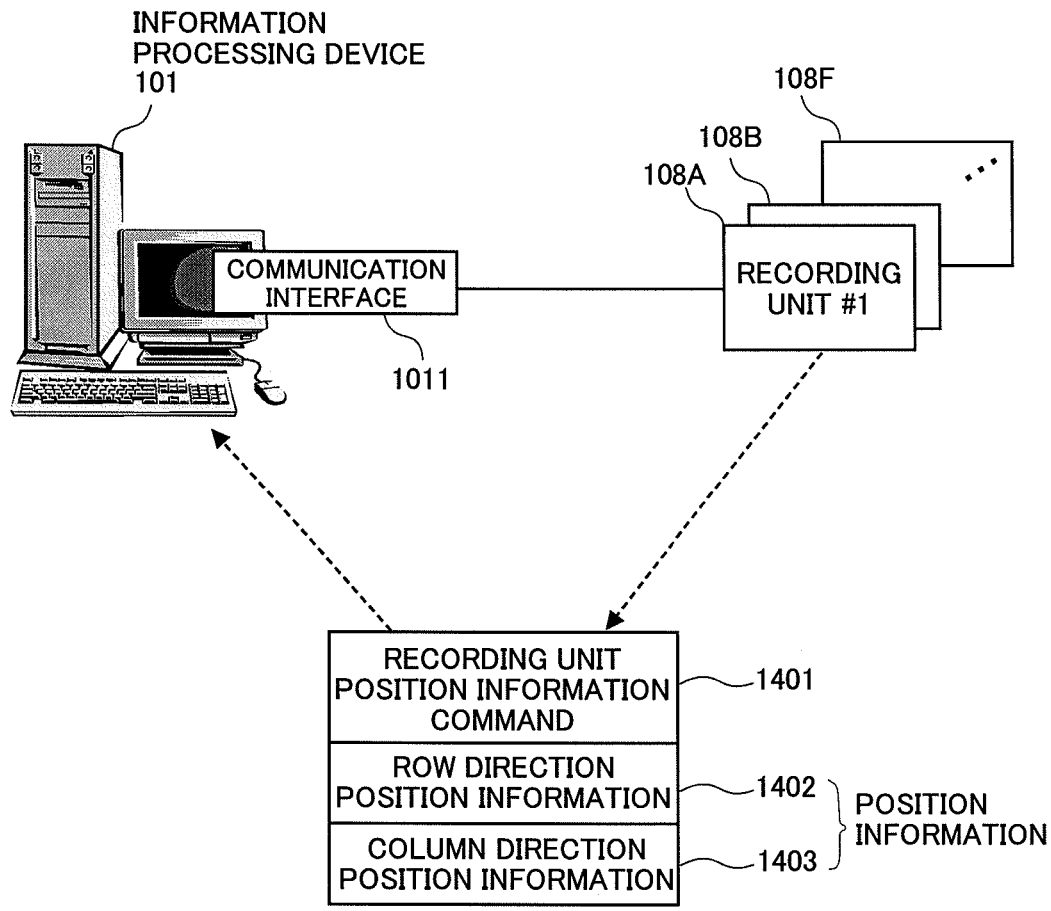
FIG. 18 is a diagram showing how position information on the recording units of the recording device in FIG. 15 is sent and received.
Figure 19:
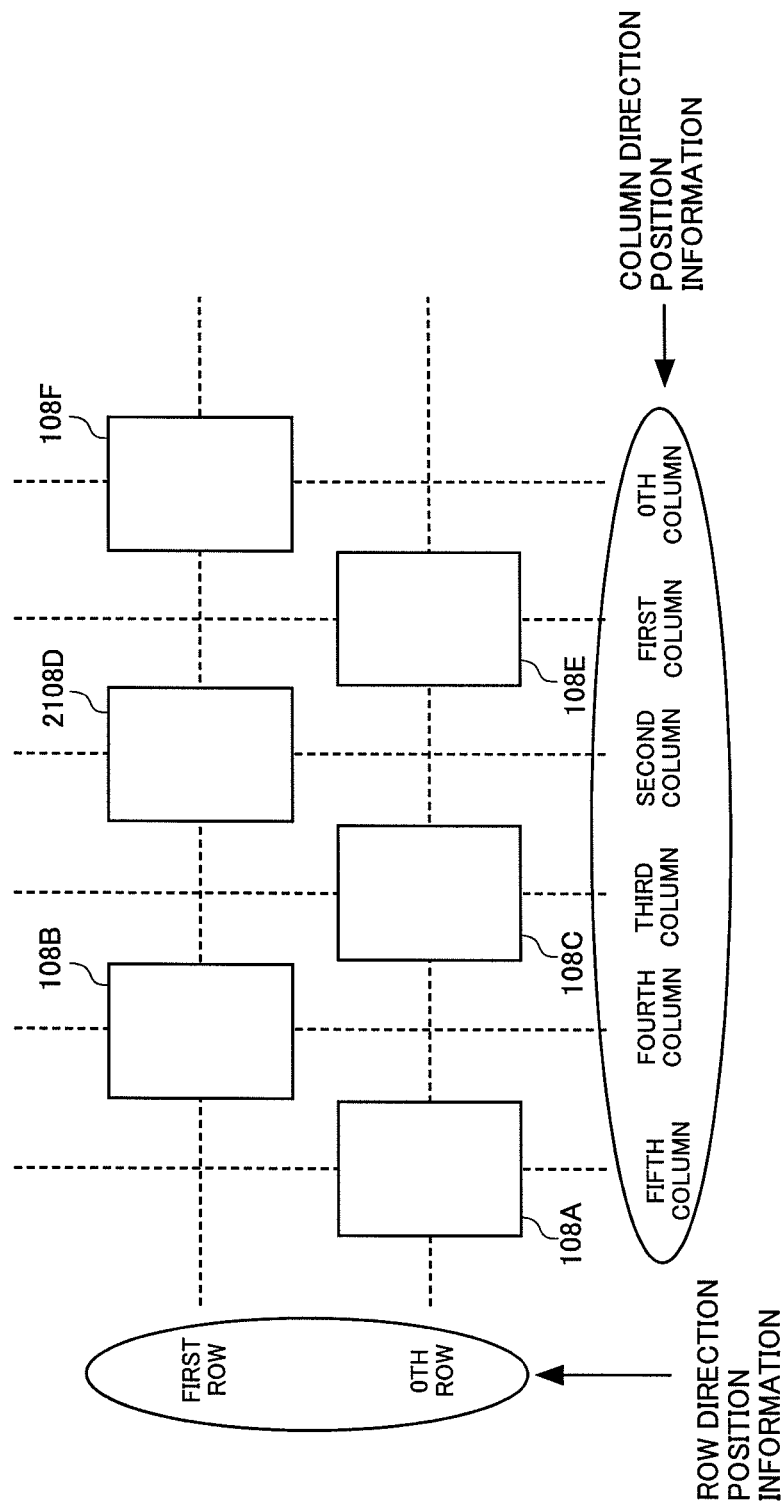
FIG. 19 is a diagram showing row direction position information and column direction position information on the recording unit in FIG. 18.

The following describes the position information with reference to FIG. 18. The position information is composed of row direction position information 1402 and column direction position information 1403. In response to a request from the information processing device 101, the position information and a recording unit position information command 1401 are transferred to the information processing device 101. The row direction position information and the column direction position information on a recording unit correspond to the row number and the column number of the recording unit when the plural recording units are arranged in a zigzag way as shown in FIG. 19. In each recording unit, this position information is specified by a DIP switch (sensor 402 in FIG. 5) provided in each recording unit.

Even if the recording units 108 are laid out in a zigzag way based on this position information, the information processing device 101 can recognize the layout of the recording units 108. That is, which divided image of the whole recording image is recorded by which recording unit is determined by the column direction position. Although the information processing device 101 does not have to recognize the row direction position in this embodiment, the row direction position can be recognized as necessary.

Figure 20:
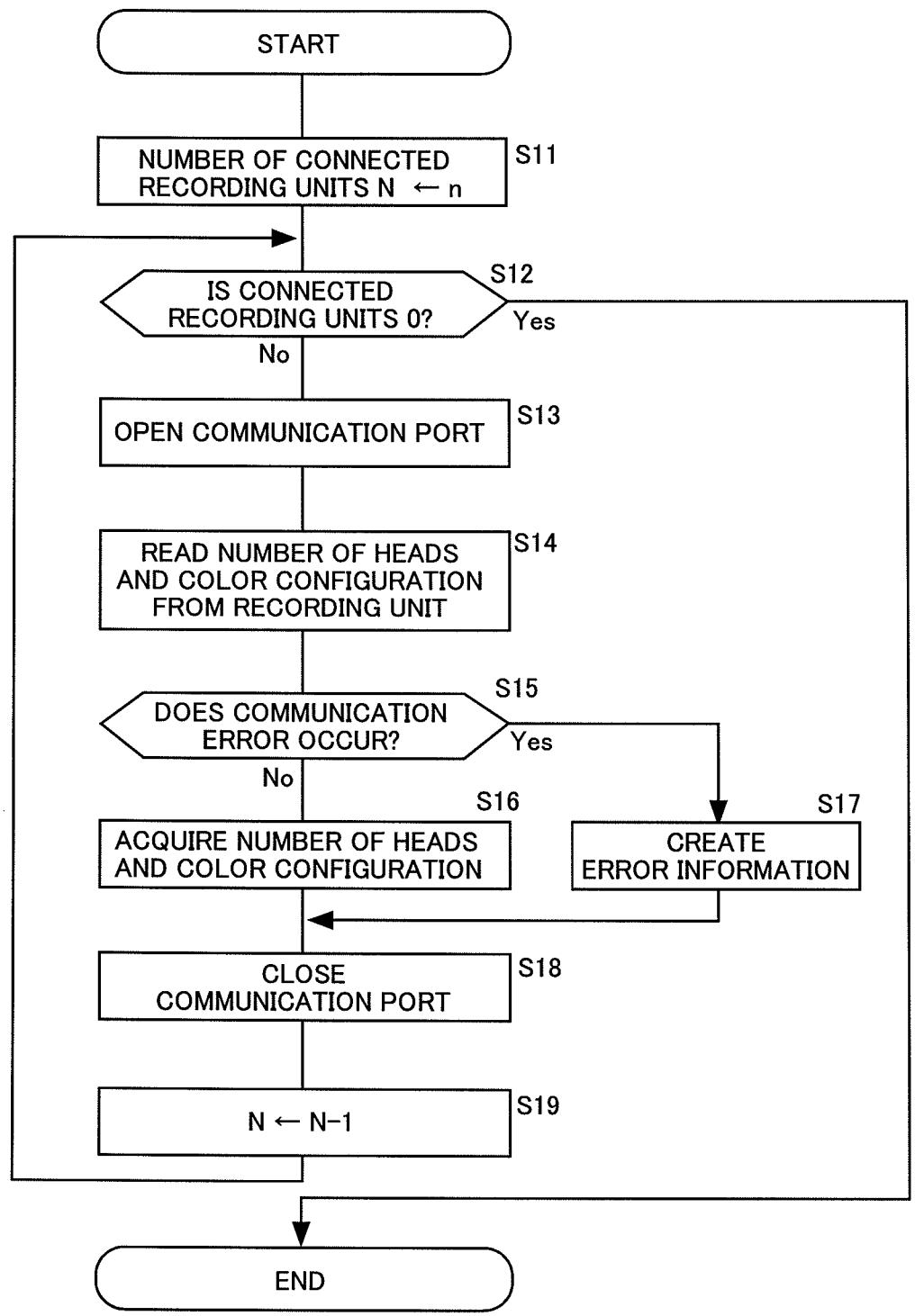
FIG. 20 is a flowchart showing processing for acquiring the registration adjustment values of the recording heads stored in each recording unit and, at the same time, acquiring recording head configuration information stored in each recording unit from the recording unit when the registration of the recording units is adjusted in the embodiment of the present invention.

FIG. 20 is a flowchart of the processing performed by the information processing device 101 for adjusting the registration of the recording unit 108. During this processing, the information processing device 101 acquires a recording head registration adjustment value (if set) provided in each recording unit and, at the same time, acquires the recording head configuration information (number of heads and color information), provided in each recording unit 108, from the recording unit. The CPU 1012 reads the control program 150 from the hard disk drive 1113 in the information processing device 101 to perform this processing.

To adjust the registration, the information processing device 101 references the number of connected recording units 232 stored in the communication resource information table 231 in FIG. 17, sets the value n as the variable N (S11), and repeats the following processing, once for each connected recording unit (S12). The information processing device 101 references the sorted communication resource information table 231 in FIG. 17 and repeats this processing in order of the recording units stored in that table.

Next, the information processing device 101 references the communication resource information (port identifier, port name, and port symbol name) 233 stored in the communication resource information table 231 in FIG. 16, opens the communication port of the corresponding recording unit (S13), and acquires information on the number of heads of the recording unit and the head color configuration (S14).

Next, the information processing device 101 checks if data is transferred correctly (or if a communication error occurs) (S15). If the status information is acquired correctly, the information processing device 101 sets the acquired information in the head configuration information table 501 shown in FIG. 21 (S16). If the status information is not acquired correctly, the information processing device 101 sets the communication error information in the head configuration information table 501 shown in FIG. 21 (in order to identify with which recording unit the information processing device 101 cannot communicate) (S17).

Next, the information processing device 101 closes the communication port (S18), decrements the number of connected recording units (S19), which is used as the repeat counter, repeats the same processing until status information is acquired from all recording units 108, and ends the processing.

The head configuration information table 501 (FIG. 21) now stores the information acquired by the head configuration information acquisition sequence shown in FIG. 20. The recording program or its utility program running on the information processing device 101 references head color information 503 on all recording units, the number of which is indicated by the number (n) of recording units (502) connected to the information processing device 101, and the registration adjustment value of the recording heads acquired at the same time, and displays a head position adjustment screen 601 such as the one shown in FIG. 22. The screen data displayed on the head position adjustment screen 601 resides in the hard disk drive 1113 or ROM 1014.

Note that "head position adjustment" means, not the physical adjustment of recording heads, but the adjustment of recording heads on a software basis. Because the head color information 503 in the head configuration information table 501 is sequentially sorted in order of recording units, the information displayed on the head position adjustment screen 601 in FIG. 22 is displayed sequentially from the top of the head color information 503.

Figure 22:
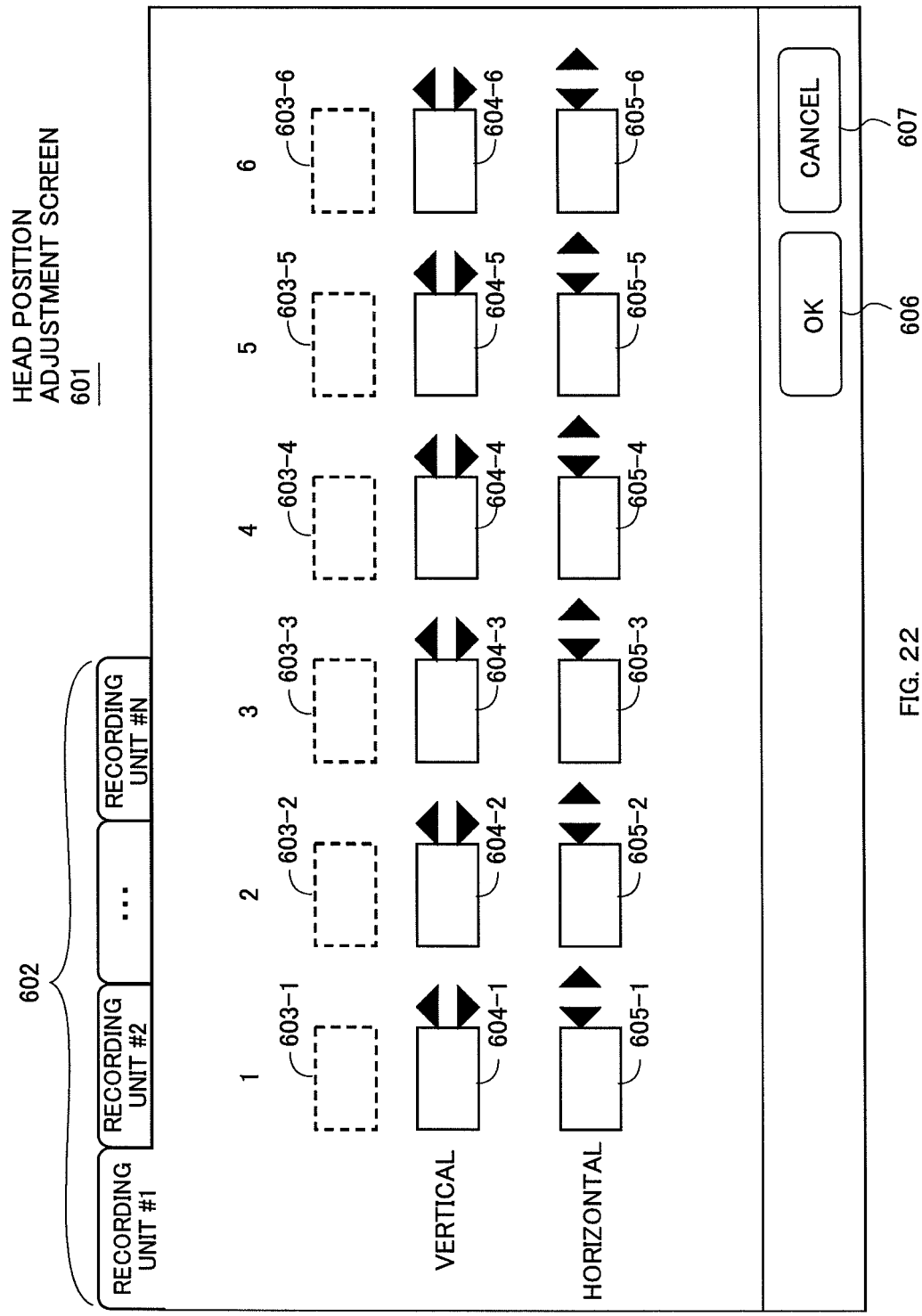
FIG. 22 is a diagram showing a head position adjustment screen created by a recording program or its utility program running on the information processing device in the embodiment of the present invention.

A property sheet with tabs 602, one for each recording unit, is displayed on the head position adjustment screen 601 shown in FIG. 22. The user can perform an operation to switch the display of this property sheet from one recording unit to another. The head color information 503 is displayed in color indication columns 603-1 to 603-6. Although the maximum number of recording heads that can be displayed is six in this embodiment, any number (five or less or seven or more) of recording heads can be displayed. In addition, the recording head registration adjustment values, acquired at the same time the head configuration information was acquired, are displayed in registration adjustment value indication columns 604-1 to 604-6 and 605-1 to 605-6 as the vertical and horizontal registration adjustment values. When the registration adjustment values of the recording units are not determined initially, no information or the default value of 0 is displayed in the registration adjustment value indication columns. An installation engineer or a user can set or correct the registration adjustment values in the registration adjustment value indication columns 604-1 to 604-6 and 605-1 to 605-6 via the keyboard or mouse operation on the operation unit.

During the vertical/horizontal registration adjustment, a registration adjustment pattern (test pattern) 700 such as the one described in FIG. 8 is recorded and the vertical/horizontal registration adjustment values, determined based on the recording result, are set in the registration adjustment indication columns 604-1 to 604-6 and 605-1 to 605-6.

Figure 24:
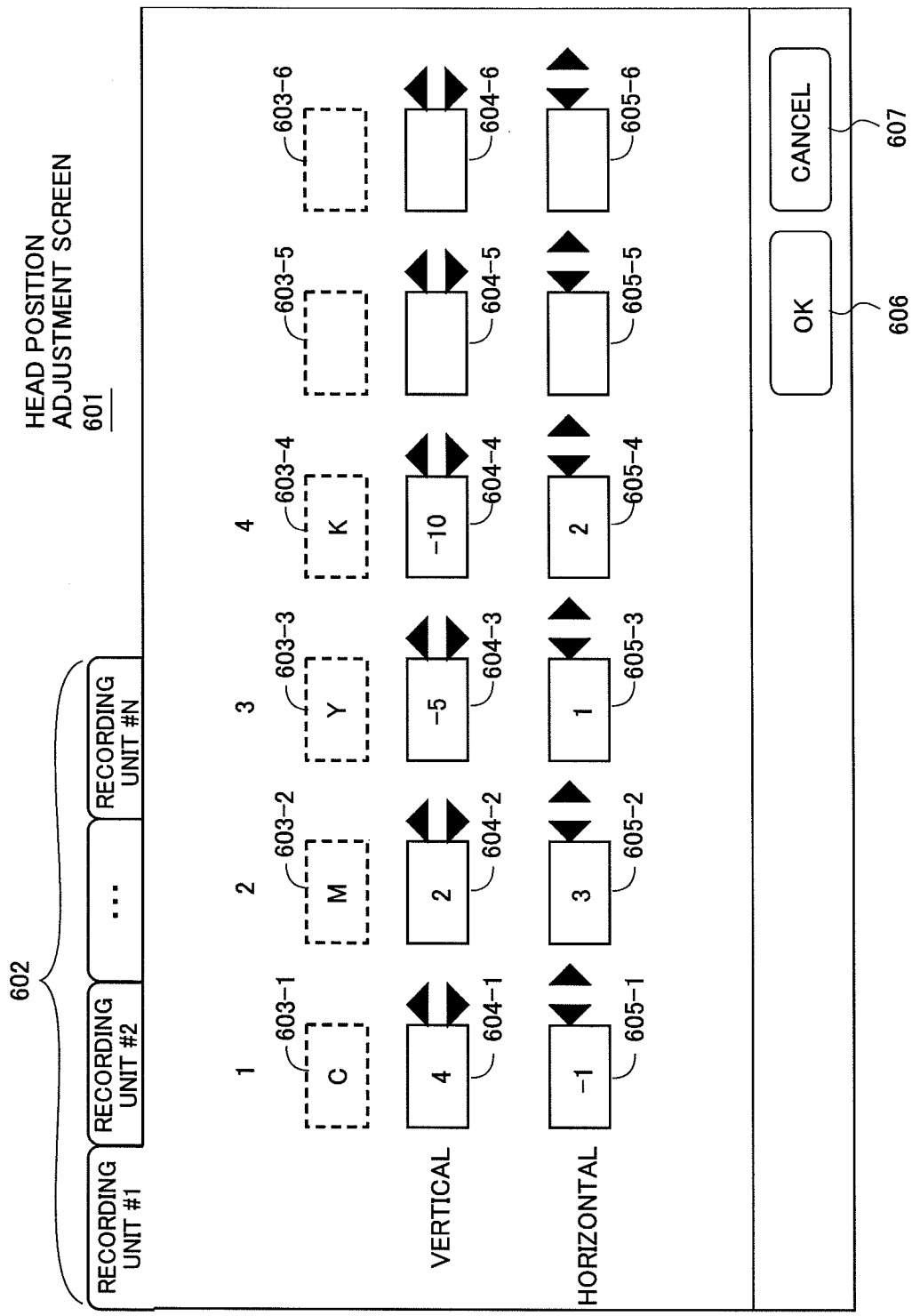
FIG. 24 is a diagram showing an example of the actual display of the head position adjustment screen in FIG. 22.

FIG. 24 shows an example of the head position adjustment screen 601 displayed when the recording heads in recording unit #1 are the cyan, magenta, yellow, and black heads. The user can select a tab to switch the screen from recording unit #1 to another recording unit.

When the user presses an "OK" button 606 on the head position adjustment screen 601 in FIG. 24, the registration adjustment values entered for the recording units are sent to the recording units and the adjustment values, already set in the recording units, are updated. When the user presses a "Cancel" button 607, the registration adjustment values that are entered are not sent to the recording units but the property sheet is closed.

Figure 23:
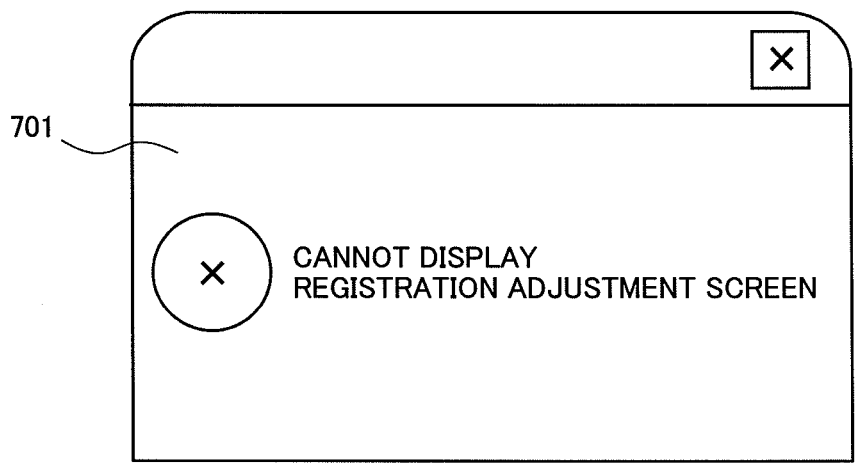
FIG. 23 is a diagram showing an example of the display of an error message in the embodiment of the present invention.

If "communication error" is set in the head configuration information table 501 (FIG. 21), the head position adjustment screen 601 is not displayed but an error message, such as the one shown in a display screen 701 in FIG. 23, is displayed.

When the head configuration information is acquired, the recording head colors are displayed in the color indication columns 603-1 to 603-6 based on the head color information 503. "C" is displayed in the color indication column 603-1 because the color of the first recording head is cyan. "M" is displayed in the color indication column 603-2 because the color of the second recording head is magenta. "Y" is displayed in the color indication column 603-3 because the color of the third recording head is yellow. "K" is displayed in the color indication column 603-4 because the color of the fourth recording head is black. No information is displayed in the color indication column 603-5 and the color indication column 603-6 because there are no corresponding recording heads for them.

For the cyan recording head that is the first recording head, the registration adjustment values of the first recording head, acquired at the same time the head color information was acquired, are displayed in the vertical/horizontal registration adjustment value indication columns 604-1 and 605-1. Similarly, the registration adjustment values of the second recording head are displayed in the registration adjustment value indication columns 604-2 and 605-2, the registration adjustment values of the third recording head are displayed in the registration adjustment value indication columns 604-3 and 605-3, and the registration adjustment values of the fourth recording head are displayed in the registration adjustment value indication columns 604-4 and 605-4. No registration adjustment value is displayed in the registration adjustment value indication columns 604-5, 605-5, 604-6, and 605-6 because there is no corresponding recording head.

Which registration adjustment pattern 700 is output depends on the head color information 503 in the head configuration information table 501. That is, one of the registration adjustment patterns, corresponding to the head configuration stored in a recording unit, is selectively output and recorded according to the head configuration information table 501.

The output of the intra-unit vertical registration adjustment part 801 and the intra-unit horizontal registration adjustment part 802 depends on the head color information 503 in the head configuration information table 501.

As described above, the user visually can check the recorded registration adjustment pattern 700 to confirm the position of a comparison bar that matches the reference bar.

To adjust the vertical registration of the plural recording heads in a recording unit, the recording time of the recording heads is shifted according to the adjustment value in synchronization with the output from the encoder 412 described above.

To adjust the horizontal registration of the plural recording heads in a recording unit, an adjustment pattern, created by rotating the vertical registration adjustment pattern 90 degrees, is used though not shown. In addition to the predetermined number of nozzles, a line-type head has extra adjustment nozzles on both sides in the head width direction. The actual horizontal adjustment is made by shifting the actually-used nozzle area (effective recording area) into the nozzle row direction based on the calculated adjustment value as mentioned above.

The general registration adjustment of a line-head type recording unit in the head-width direction (horizontal direction) is as described with reference to FIG. 10 and FIG. 11.

The user enters the final registration adjustment values, acquired as described above, from the information processing device 101 via the head position adjustment screen 601 shown in FIG. 22. The vertical registration adjustment value and the horizontal registration adjustment value, read out of the inter-unit adjustment part 800, are input to the reference head (that is, black head) of each recording unit. The vertical registration adjustment value and the horizontal registration adjustment value, read respectively from the intra-unit vertical registration adjustment part 801 and the intra-unit horizontal registration adjustment part 802, are input to the color heads of each recording unit.

After being corrected as described above, the received adjustment values are sent to the recording device for updating the existing adjustment values in the storage unit of each recording unit and set in each recording unit. The registration adjustment values that are set in each recording unit are referenced during recording processing for adjusting the registration.

The registration among plural recording units is adjusted using the reference head in each recording unit. More specifically, in the overlapping part of the recording heads of the neighboring recording units, a registration adjustment pattern (not shown) in both vertical and horizontal directions is recorded for detecting the amount of errors with one of the reference heads used as the reference head and the other used as the comparison head. The registration adjustment values among the recording units are used to correct the registration adjustment values among plural recording heads in each recording unit described above to adjust the registration of the whole recording device.

When the recording device 100 is installed, an installation engineer, such as a service engineer, uses the head position adjustment screen such as the one described above to set values in each recording unit. When the user uses the recording device thereafter, the information processing device acquires the recording head configuration information and the registration adjustment values, stored in a recording unit as described in this embodiment, and records a registration adjustment pattern so that the user can adjust the vertical and horizontal registration based on the recorded result.

In this embodiment, too, various modifications and changes are possible.

As in the first embodiment, another system may be employed that has an image reader, such as a scanner, in the ejection unit of the recording device for automatically reading a recorded registration adjustment pattern via the image reader to determine an adjustment value. The number of recording heads in a recording unit is not limited to four. The reference head of a recording unit may be a color head. Plural black heads may also be used in a recording unit. The number of recording units is not limited to six either. The inkjet recording method is not limited to inkjet. The recording paper is not limited to sheet-like recording paper, but the recording device is applicable also to long label sheets or tag sheets.

In a recording system where plural recording units each including plural recording heads are connected to the information processing device via the communication interface and the plural recording units are used to form an image on the same recording medium, the head configuration information is acquired from the recording units in this embodiment to allow the user to adjust the registration without considering the recording head configuration of each recording unit even when a recording unit is replaced or the head configuration of a recording unit is changed.

What is claimed is:

1. A registration adjustment method for adjusting errors in recording positions for use in a recording device having a plurality of recording units, each including a plurality of line-type recording heads, for recording divided recording images on a same recording medium using said plurality of recording units, neighboring recording units of which have an overlapping recording area where recording areas of said neighboring recording units overlap each other in end parts of the recording heads thereof, said registration adjustment method comprising the steps of:

causing said plurality of recording units to record an inter-unit registration adjustment pattern for detecting errors in position between said neighboring recording units with one of the neighboring recording units used as a reference recording unit with respect to another of the neighboring recording units, and an intra-unit registration adjustment pattern for detecting errors in position among the recording heads of each recording unit with one of the recording heads thereof used as a reference recording head with respect to other recording heads thereof, said inter-unit registration pattern being recorded by the reference recording head of each recording unit without using the recording heads other than the reference recording heads, said intra-unit registration pattern being recorded by the reference recording head with other recording heads of each recording unit;

accepting input of inter-unit registration adjustment values obtained based on the recorded inter-unit registration adjustment pattern and intra-unit registration adjustment values obtained based on the recorded intra-unit registration adjustment pattern; and storing in a storage area the inter-unit registration adjustment values and the intra-unit registration adjustment values;

making an inter-unit registration adjustment based on the stored inter-unit registration adjustment values; and making an intra-unit registration adjustment based on the stored intra-unit registration adjustment values.

2. The registration adjustment method according to claim 1, wherein the inter-unit registration adjustment pattern comprises an inter-unit registration adjustment part, and the intra-unit registration adjustment pattern comprises an intra-unit vertical registration adjustment part and an intra-unit horizontal registration adjustment part, all said registration adjustment parts being formed on one recording medium.

3. The registration adjustment method according to claim 2, wherein
the inter-unit registration adjustment pattern includes a pattern part recorded in the overlapping recording area of said neighboring recording units by the reference recording head of one of the neighboring recording units and the reference recording head of the other of the neighboring recording units, and;
wherein in case that an adjustment value has been obtained for a compared recording unit with respect to a reference recording unit of a given neighboring recording units during the inter-unit registration adjustment, the same adjustment value is added to the registration adjustment value or values obtained for other compared recording unit or units that reside on a side of the compared recording unit of said given neighboring recording units.

4. The registration adjustment method according to claim 3, further comprising the steps of:
calculating an average value from a maximum value and a minimum value among the registration adjustment values for neighboring recording units, obtained as a result of the inter-unit registration adjustment; and
correcting the inter-unit registration adjustment values equally by the average value.

5. The registration adjustment method according to claim 4, wherein addition of the inter-unit registration adjustment value, the correction by the average value, and a determination of the registration adjustment values for the recording heads other than the reference recording head in each recording unit are performed through calculation, based on vertical registration adjustment values and horizontal registration adjustment values of the inter-unit registration adjustment, intra-unit vertical registration adjustment values, and intra-unit horizontal registration adjustment values obtained based on the recorded registration adjustment patterns.

6. The registration adjustment method according to claim 1, each of the registration adjustment patterns includes a plurality of sets of a reference bar which is recorded by the reference recording head and a compared bar which is recorded by other recording head such that the compared bars are shifted with respect to corresponding reference bars by successive different amounts.

7. A recording system having a plurality of recording units, each including a plurality of line-type recording heads, for recording divided recording images on a same recording medium using said plurality of recording units, neighboring recording units of which have an overlapping recording area where recording areas of said neighboring recording units overlap each other in end parts of the recording heads thereof, said recording system comprising:

a registration adjustment pattern recorder that records an inter-unit registration adjustment pattern for detecting errors in position between said neighboring recording units with one of the neighboring recording units used as a reference recording unit with respect to another of the neighboring recording units, and an intra-unit registration adjustment pattern for detecting errors in position among the recording heads of each recording unit with one of the recording heads thereof used as a reference recording head with respect to other recording heads thereof an accepting unit for accepting input of inter-unit registration adjustment values obtained based on the recorded inter-unit registration adjustment pattern and intra-unit registration adjustment values obtained based on the recorded intra-unit registration adjustment pattern, said inter-unit registration pattern being recorded by the reference recording head of each recording unit without using the recording heads other than the reference recording heads, said intra-unit registration pattern being recorded by the reference recording head with other recording heads of each recording unit;

a storage unit for storing in a storage area the inter-unit registration adjustment values and intra-unit registration adjustment values accepted by the accepting unit;

an inter-unit registration adjusting unit for making an inter-unit registration adjustment based on the stored inter-unit registration adjustment values; and an intra-unit registration adjusting unit for making an intra-unit registration adjustment based on the stored intra-unit registration adjustment values.

8. The recording system according to claim 7, wherein the inter-unit registration adjustment pattern comprises an inter-unit registration adjustment part, and the intra-unit registration adjustment pattern comprises an intra-unit vertical registration adjustment part and an intra-unit horizontal registration adjustment part, all said registration adjustment parts being formed on one recording medium.

9. The recording system according to claim 8, wherein
the inter-unit registration adjustment pattern includes a pattern part recorded in the overlapping recording area of said neighboring recording units by the reference recording head one of the neighboring recording units and the reference recording head of the other of the neighboring recording units, and
wherein said inter-unit registration adjusting unit serves, in case that a registration adjustment value has been obtained for a compared recording unit with respect to a reference recording unit of a given neighboring recording units during the inter-unit registration adjustment, such that the same registration adjustment value is added to the registration adjustment value or values obtained for other compared recording units that reside on a side of the compared recording unit of said given neighboring recording units.

10. The recording system according to claim 9, wherein, as a result of the inter-unit registration adjustment during the inter-unit registration adjustment, an average value is calculated from a maximum value and a minimum value among the registration adjustment values for neighboring recording units to correct the inter-unit registration adjustment values by the average value.

11. The recording system according to claim 7, wherein a determination of final registration adjustment values by said adjustment value setting unit is made by a host computer to which said plurality of recording units are connected.

12. The recording system according to claim 11, wherein a correction of the registration adjustment values is made by one of said plurality of recording units.

13. The recording system according to claim 7, wherein the registration adjustment values are determined based on values entered by a user based on the recorded registration adjustment patterns.

14. The recording system according to claim 7, wherein the registration adjustment values are determined by the recorded registration adjustment pattern read by an image reader.

15. The recording system according to claim 7, wherein said line-type recording heads are inkjet recording heads that eject ink for recording.

16. A registration adjustment value determination method for determining registration adjustment values for use in a recording device having a plurality of recording units, each including a plurality of line-type recording heads, for recording divided recording images on a same recording medium using said plurality of recording units, said registration adjustment value determination method comprising the steps of:
  causing said plurality of recording units to record an inter-unit registration adjustment pattern for registration among said recording units and an intra-unit registration adjustment pattern for registration among the recording heads of each of said recording units;
  accepting input of registration adjustment values for registration among said recording units associated with the recorded inter-unit registration adjustment pattern, and registration adjustment values for registration among the recording heads of each of said recording units associated with the recorded intra-unit registration adjustment pattern; and
  storing, as setting values, said registration adjustment values for registration among said recording units, accepted in said step of accepting input, and said registration adjustment values for registration among the recording heads of each of said recording units,
  wherein said inter-unit registration adjustment pattern for registration among said recording units and said intra-unit registration adjustment pattern for registration among the recording heads of each of said recording units are formed on one recording medium, and
  wherein neighboring recording units of said plurality of recording units have an overlapping recording area where recording areas of the neighboring recording units overlap each other in end parts of the recording heads thereof, and
  the inter-unit registration adjustment pattern is a pattern recorded in the overlapping recording area of the neighboring recording units of said plurality of recording units by a reference recording head being one of the recording units and a corresponding reference recording head of another recording unit, and
  said method, further comprising the step of:
  calculating an average value from a maximum value and a minimum value of adjustment values of all recording units, obtained as a result of the inter-unit registration adjustment; and
  correcting and resetting the inter-unit registration adjustment values of all recording units equally by the average value.

17. The registration adjustment value determination method according to claim 16, wherein a same inter-unit registration adjustment value is added to all other recording units on a side of a compared recording unit when a recording position of said compared recording unit is corrected, said compared recording unit being compared with a reference recording unit during the inter-unit registration adjustment, said reference recording unit being one of the two neighboring recording units and wherein the addition of the inter-unit registration adjustment value, the correction by the average value, and a determination of final adjustment values of recording heads other than the reference head in each recording unit are performed through calculation, based on vertical registration adjustment values and horizontal registration adjustment values of the inter-unit registration adjustment, intra-unit vertical registration adjustment values, and intra-unit horizontal registration adjustment values obtained from the recorded registration adjustment pattern.

18. A registration adjustment value determination method for determining registration adjustment values for use in a recording device having a plurality of recording units, each including a plurality of line-type recording heads, for recording divided recording images on a same recording medium using said plurality of recording units, said registration adjustment value determination method comprising the steps of:
  causing said plurality of recording units to record an inter-unit registration adjustment pattern for registration among said recording units and an intra-unit registration adjustment pattern for registration among the recording heads of each of said recording units;
  accepting input of registration adjustment values for registration among said recording units associated with the recorded inter-unit registration adjustment pattern, and registration adjustment values for registration among the recording heads of each of said recording units associated with the recorded intra-unit registration adjustment pattern; and
  storing, as setting values, said registration adjustment values for registration among said recording units, accepted in said step of accepting input, and said registration adjustment values for registration among the recording heads of each of said recording units, and
  wherein said vertical registration adjustment values and said horizontal registration adjustment values between the reference recording unit and a neighboring recording unit are added as values with adjusting direction, respectively to said vertical registration adjustment values and said horizontal registration adjustment values between the neighboring recording unit and a further neighboring recording unit in a same recording width direction.

19. A recording apparatus having a plurality of recording units, each including a plurality of line-type recording heads, for recording divided recording images on a same recording medium using said plurality of recording units, said recording system comprising:
  a registration adjustment pattern recorder that records an inter-unit registration adjustment pattern for detecting errors in position among said recording units; and
  an accepting unit for accepting input of inter-unit registration adjustment values obtained based on the recorded inter-unit registration adjustment pattern, said inter-unit registration pattern being recorded by a reference recording head of each recording unit,
  wherein said registration adjustment pattern recorder records an intra-unit registration adjustment pattern for detecting errors in position among the recording heads of each recording unit;
  said accepting unit accepting input of intra-unit registration adjustment values obtained based on the recorded intra-unit registration adjustment pattern, and said intra-unit registration pattern being recorded by the reference recording head with other recording heads of each recording unit.

20. A registration adjustment method for adjusting errors in recording positions for use in a recording device having a plurality of recording units, each including a plurality of line-type recording heads, for recording divided recording images on a same recording medium using said plurality of recording units, said registration adjustment method comprising the steps of:

causing said plurality of recording units to record an inter-unit registration adjustment pattern for detecting errors in position among said recording units, said inter-unit registration pattern being recorded by a reference recording head of each recording unit, wherein said plurality of recording units record an intra-unit registration adjustment pattern for detecting errors in position among the recording heads of each recording unit, said intra-unit registration pattern being recorded by the reference recording head with other recording heads of each recording unit.

* * * * *